(12) United States Patent  
Younkle

(10) Patent No.: US 7,278,454 B2
(45) Date of Patent: Oct. 9, 2007

(54) BEVERAGE DISPENSING APPARATUS

(75) Inventor: Matthew C. Younkle, Chicago, IL (US)

(73) Assignee: Laminar Technologies, LLC, Chicago, IL (US)

(*) Notice: Subject to any disclaimer, the term of this patent is extended or adjusted under 35 U.S.C. 154(b) by 504 days.

(21) Appl. No.: 10/388,907

(22) Filed: Mar. 13, 2003

(65) Prior Publication Data
US 2004/0177893 A1 Sep. 16, 2004

(51) Int. Cl.
B65B 1/04 (2006.01)

(52) U.S. Cl. .................. 141/374; 141/255; 141/285; 222/402.23; 222/509

(58) Field of Classification Search .............. 222/54, 222/306, 321.6, 402.23, 402.25, 505, 509, 222/640, 322; 141/2, 18, 54, 57, 67, 94–96, 141/192, 198, 255, 285, 301, 374
See application file for complete search history.

(56) References Cited

U.S. PATENT DOCUMENTS

| 1,654,249 | A |   | 12/1927 | Ernst |
| 2,575,658 | A |   | 11/1951 | Del Nero |
| 2,750,079 | A |   | 6/1956 | Trombley |
| 2,910,247 | A | * | 10/1959 | Allshouse et al. ........ 239/417.3 |
| 2,912,143 | A | * | 11/1959 | Woolfolk ................. 222/129.4 |
| 3,129,894 | A |   | 4/1964 | Schermerhorn |
| 3,307,751 | A |   | 3/1967 | Kraft |
| 3,402,857 | A |   | 9/1968 | Ecklund et al. |
| 3,651,991 | A | * | 3/1972 | Ohlson et al. ........... 222/144.5 |
| 4,111,243 | A | * | 9/1978 | Fetterman ................... 141/102 |
| 4,271,992 | A | * | 6/1981 | Becker ........................ 222/509 |
| 4,519,427 | A |   | 5/1985 | Ono et al. |
| 4,606,382 | A |   | 8/1986 | Biller et al. |
| 4,648,421 | A |   | 3/1987 | Chant et al. |
| 5,115,841 | A |   | 5/1992 | Horino et al. |
| 5,238,155 | A |   | 8/1993 | Blake, III |
| 5,368,205 | A | * | 11/1994 | Groh ....................... 222/189.06 |
| 5,566,732 | A |   | 10/1996 | Nelson |
| 5,573,145 | A |   | 11/1996 | Groh |
| 5,603,363 | A |   | 2/1997 | Nelson |
| 5,607,084 | A |   | 3/1997 | George |
| 5,758,698 | A | * | 6/1998 | Kaneko ....................... 141/263 |
| 5,794,823 | A | * | 8/1998 | Roundtree ................. 222/400.7 |

(Continued)

FOREIGN PATENT DOCUMENTS

BE 549 933 A 12/1959

(Continued)

OTHER PUBLICATIONS

Communication from the European Patent Office regarding Supplemental European Search Report for PCT/US0307972, dated Jul. 5, 2006.

(Continued)

Primary Examiner—Timothy L. Maust
(74) Attorney, Agent, or Firm—Brinks Hofer Gilson & lione

(57) ABSTRACT

A beverage dispensing device for dispensing pressurized beverages at a high flow rate without producing excessive foaming comprising a streamlined valve assembly and a downward extending nozzle assembly which permits a range of containers to be filled from the bottom.

73 Claims, 15 Drawing Sheets

U.S. PATENT DOCUMENTS

| | | |
|---|---|---|
| 5,842,617 A | 12/1998 | Younkle et al. |
| 5,862,996 A | 1/1999 | Crichton |
| 5,996,842 A | 12/1999 | Riley et al. |
| 6,019,257 A | 2/2000 | Rasmussen |
| 6,041,970 A | 3/2000 | Vogel |
| 6,230,767 B1 | 5/2001 | Nelson |
| 6,234,222 B1 | 5/2001 | Nelson |
| 6,234,223 B1 | 5/2001 | Nelson |
| 6,237,652 B1 | 5/2001 | Nelson |
| 6,276,150 B1 | 8/2001 | Nelson |
| 6,397,909 B1 | 6/2002 | Nelson |
| 6,401,598 B1 | 6/2002 | Tavlaride |
| 6,695,168 B2 * | 2/2004 | Pinedjian et al. ............. 222/54 |

| | | |
|---|---|---|
| 2002/0088826 A1 | 7/2002 | Barker et al. |

FOREIGN PATENT DOCUMENTS

| | | |
|---|---|---|
| EP | 0 300 701 A1 | 1/1989 |
| EP | 0 861 801 A1 | 2/1997 |
| GB | 484 210 | 3/1938 |
| GB | 898 050 | 6/1962 |

OTHER PUBLICATIONS

Communication from the European Patent Office regarding Supplemental European Search Report for PCT/US0307972, date Jul. 5, 2006.

* cited by examiner

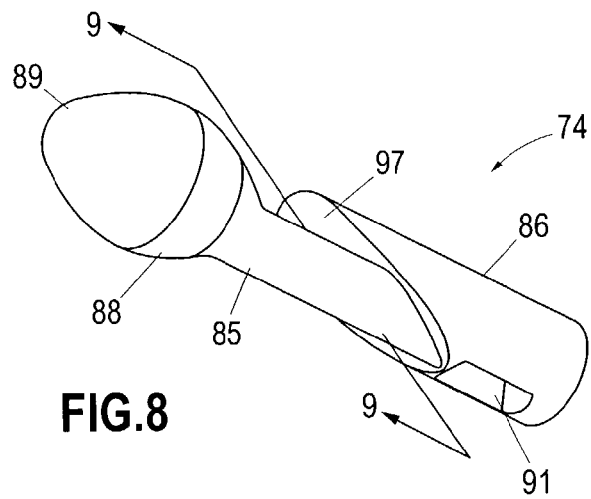
FIG.8
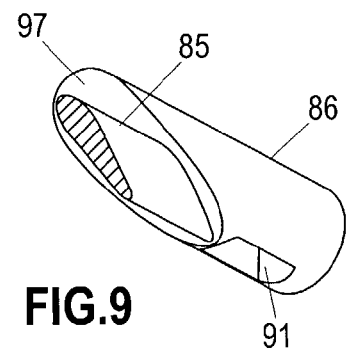
FIG.9
FIG.10
Prior Art
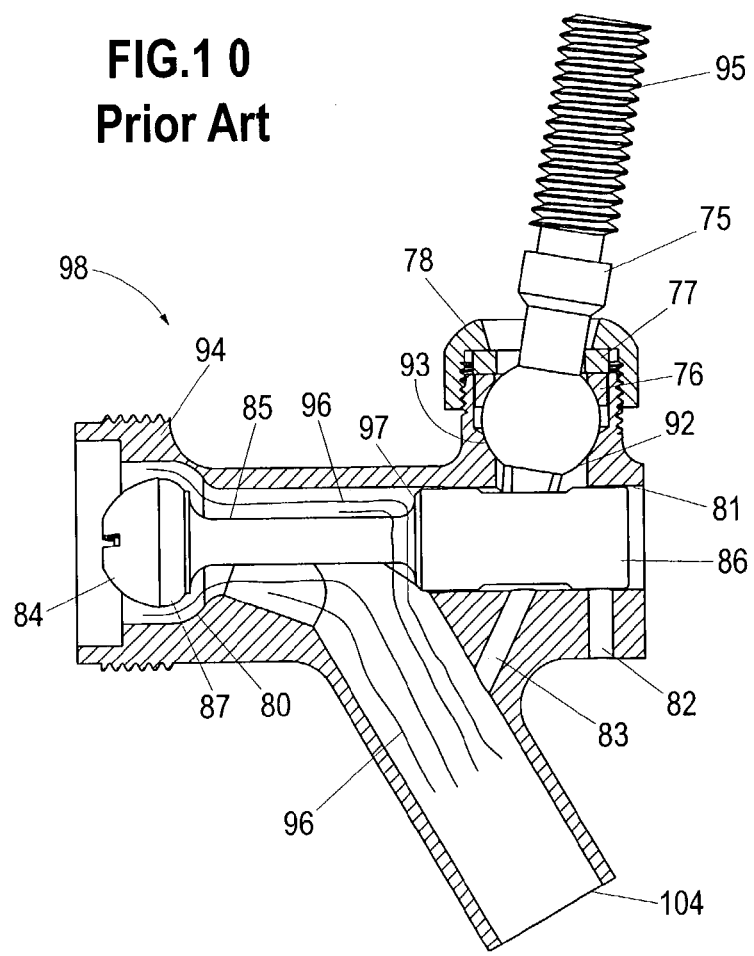

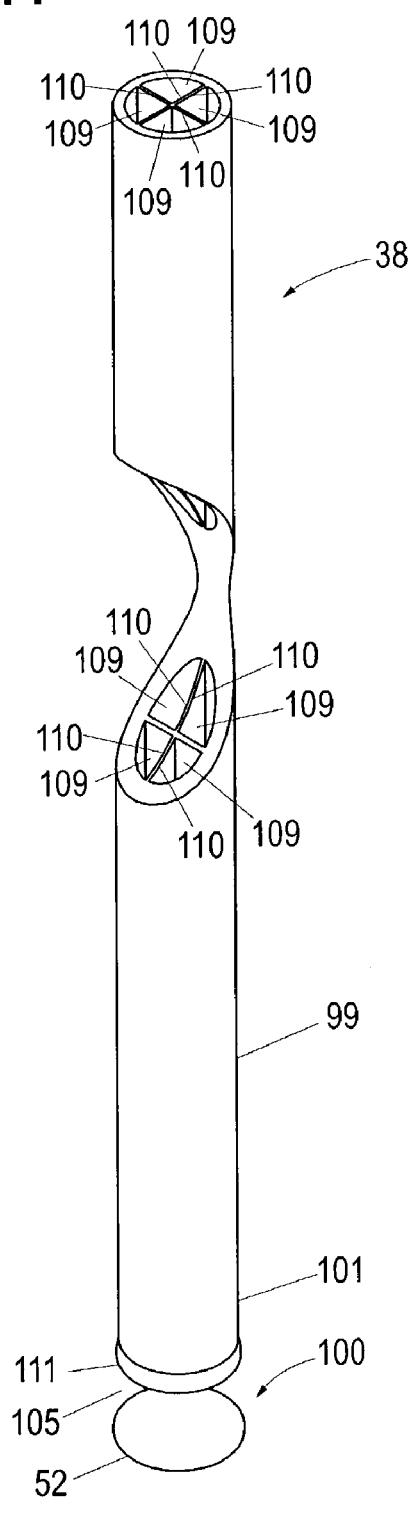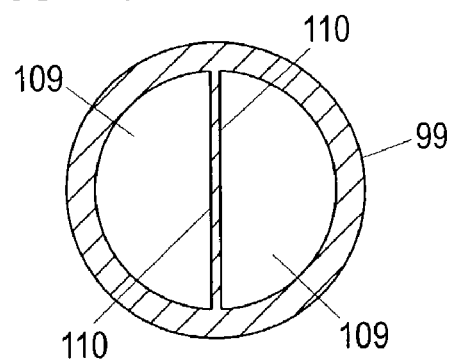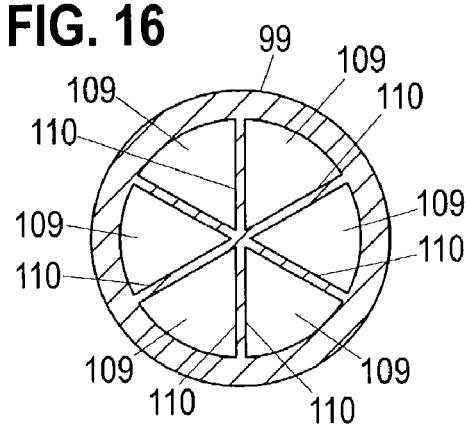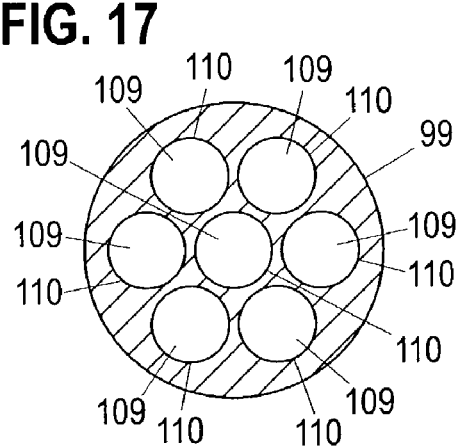

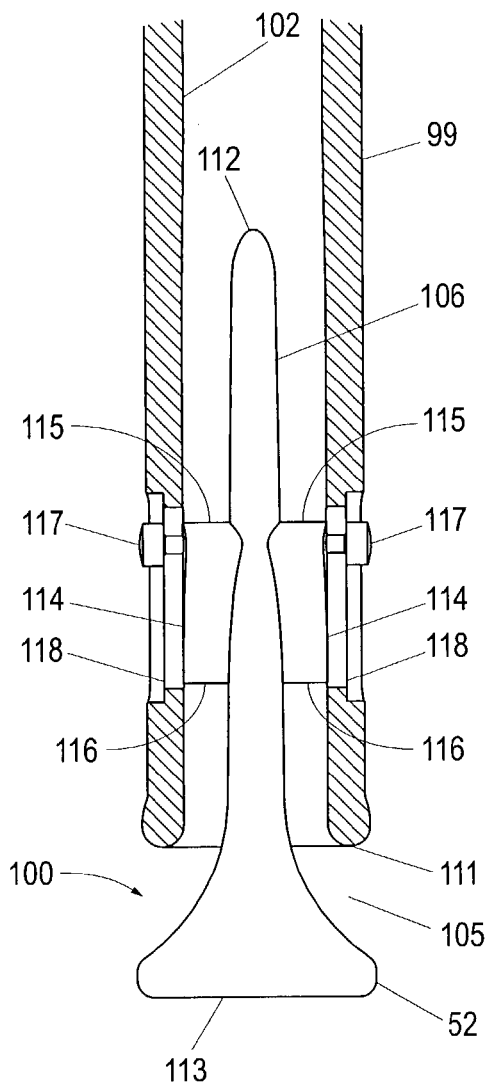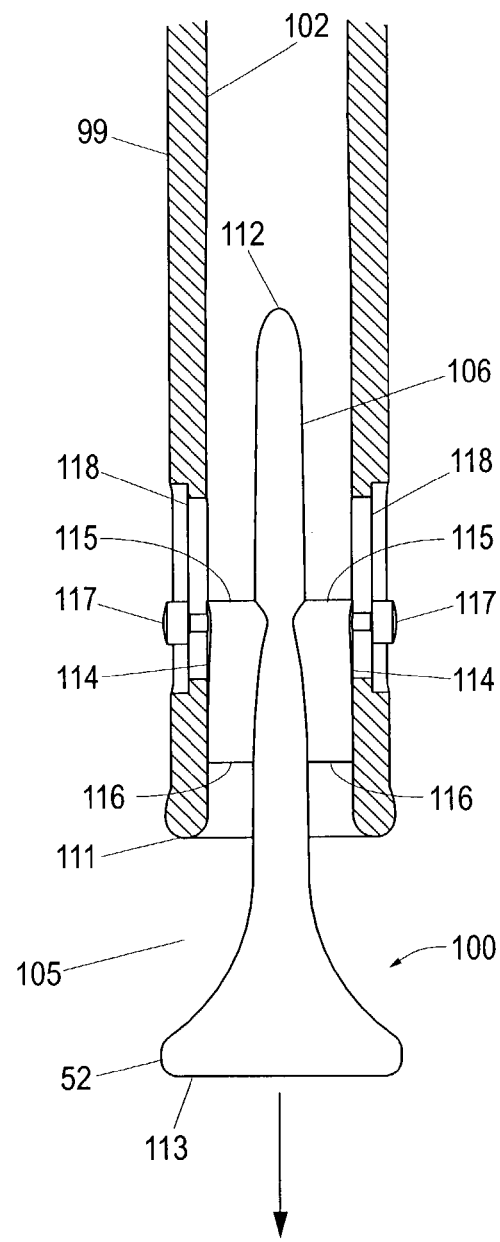

BEVERAGE DISPENSING APPARATUS

The present invention relates to an apparatus for dispensing carbonated or pressurized beverages, and more specifically to an apparatus for dispensing carbonated or pressurized beverages at high flow rates with minimal foaming.

BACKGROUND OF THE INVENTION

Pressurized beverages, such as beer, are produced in a manner that the beverage contains a certain amount of dissolved gas, typically carbon dioxide ($CO_2$). While a certain amount of dissolved $CO_2$ occurs naturally in the beer brewing and fermentation process, most large commercial breweries dissolve additional $CO_2$ into their product. Adding additional $CO_2$ serves two main purposes for the commercial breweries. First, from a quality control standpoint, all the beer produced can be modified to contain the same amount of $CO_2$. Second, the additional $CO_2$ gives the beer a more effervescent quality, which is perceived by the consumer as having better crispness and flavor.

Beer produced by most major breweries contains between 10 and 15 psi (68950 and 103425 Newtons per square meter) of dissolved $CO_2$. Since atmospheric levels of $CO_2$ are substantially smaller, beer has a tendency to release some of its dissolved $CO_2$ when exposed to the ambient atmosphere. Due to the complex chemical makeup of beer, foam tends to form when this dissolved $CO_2$ comes out of solution.

Additional parameters contributing to the amount of foam occurring in beer include temperature and turbulence. The physical properties of liquids dictate that the higher the liquid temperature, the lower its capacity for dissolved gasses. Thus, the greater the temperature of beer, the greater the tendency for its dissolved gasses to come out of solution and the greater the tendency of the beer to foam. Turbulence and other forms of agitation produce regions of sudden, extreme pressure variation within the beer that cause $CO_2$ to come out of solution in the form of foam.

While much of the beer produced by the major commercial breweries tends to be packaged in bottles and cans, a large volume of beer is also packaged in large, sealed containers known as kegs. Kegs are reusable and refillable aluminum containers that allow for efficient, sanitary handling, storage and dispensing of typically 15.5 gallons (58.7 liters) of beer. Beer packaged into kegs, called keg beer, is commonly served at bars, taverns, night clubs, stadiums, festivals and large parties.

Dispensing keg beer into open containers for consumption requires specialized equipment. The beer dispensing faucet (commonly called the beer tap) comprises a valve and a spout for controlling and directing the flow of beer into an open container. Beer often foams as it is dispensed from conventional faucets. One cause of such foaming is simply the pressure differential between $CO_2$ dissolved in the beer and $CO_2$ present in the ambient atmosphere; $CO_2$ will naturally be released from the beer when the beer is exposed to the atmosphere. Another cause of such foaming is the turbulent nature by which beer is dispensed from conventional faucets; even when dispensed carefully, beer splashes onto the walls and bottom of the container and foam results.

A small amount of foam is often desirable. Beer that has not been stored properly often loses its dissolved $CO_2$ to the atmosphere and is considered to be flat. Thus, a small amount of foam indicates to the consumer that the beer is fresh. Additionally, beer marketers have been successful in portraying the perfect container of beer as possessing a frothy layer of foam. On the other hand, too much foam is undesirable to the consumer and the beverage vendor. Since foam fills up a container with $CO_2$ instead of with liquid beer, excessive amounts of foam leave the consumer dissatisfied, often to the point of requesting a new container be served. Knowing this, vendors are left with two choices. They can partially fill a container, wait for the foam to dissipate and then add additional beer, a time-consuming process. Alternatively, they can pour out excess foam as they are filling the container, wasting beer in the process.

Since excessive foaming is problematic for both the consumer and the vendor, attempts have been made to design beer dispensing systems that are installed and configured in a manner that ideally achieves optimal amounts of foam in the dispensing process. In addition to maintaining the beer at a constant, cold temperature throughout the dispensing process, conventional beer dispensing systems are configured to pour beer at a slow enough flow rate that beer exits the faucet at a velocity that does not cause foaming when the beer impacts the container.

Conventional systems are optimized for a flow rate of one U.S. gallon (3.785 liters) per minute. While such a flow rate is suitable for most low-volume dispensing applications, there are many situations in which it would be beneficial for both the vendor and the consumer if beer could be dispensed more quickly while still maintaining optimal amounts of foam. At busy bars, taverns, festivals, large parties and stadiums, consumers often must wait in long lines before being served. Under these circumstances, it would be desirable for both the vendor and the consumer for beer to be dispensed more quickly.

Previous beer dispensing systems have been designed to dispense beer more quickly than the standard one U.S. gallon per minute flow rate. One drawback with these systems is that they typically employ elaborate electronic control mechanisms, making them expensive to manufacture and maintain. Additionally, some of these systems employ the use of a reservoir near the point of the faucet making the devices large and difficult to clean. Moreover, the retrofit of such devices onto existing bar tops can be difficult and expensive.

SUMMARY OF THE INVENTION

The present invention is directed to a beverage dispensing device for dispensing pressurized beverages at a flow rate substantially higher than prior mechanical tap apparatus without producing excessive foaming. It can be implemented as a purely mechanical device so as to keep manufacturing and maintenance costs low. In addition, the present invention can be implemented without the use of reservoirs at or near the point of dispensing, thus facilitating cleaning and retrofitting to existing bar tops.

In a preferred embodiment, the present invention comprises a beverage dispensing apparatus for dispensing a pressurized beverage comprising a nozzle through which the pressurized beverage at least initially exits at atmospheric conditions having an internal passageway, a liquid receiving end adapted to attach as the end element of a pressurized beverage dispensing system, and a liquid dispensing end that dispenses the pressurized beverage at least initially to atmospheric conditions, wherein the cross-sectional area of the internal passageway of the nozzle decreases from the liquid receiving end to the liquid dispensing end.

In another embodiment, the present invention comprises an upward extending neck, a streamlined valve assembly and a downward extending nozzle assembly. The overall shape and size of the device permits a range of containers to be filled from the bottom. Additionally, the nozzle assembly contains a streamlined flow redirecting component that serves to generally radially disperse liquid flow. Thus, the amount of foaming that occurs when beer is dispensed at fast rates is desirably reduced.

In one embodiment, the horizontal cross-sectional area of the nozzle gradually decreases from the top of the nozzle to the bottom or liquid dispensing end of the nozzle. Preferably, the profile of this decreasing cross-sectional area is consistent with that of a liquid stream falling under the force of gravity in the absence of such a nozzle. A nozzle with this shape ensures that liquid flowing through it remains in substantially continuous contact with the interior wall of the nozzle. In this way, air from the liquid dispensing end of the nozzle is prevented from bubbling up into the nozzle. Additionally, the viscous forces acting between the nozzle interior wall and the liquid flowing through the nozzle serve to counteract the acceleration experienced by the liquid in the nozzle due to gravitational forces.

In another embodiment of the invention, flow-straightening elements are added to the nozzle which serve to make the flow of liquid through the nozzle less turbulent. Such elements also increase the amount of surface area across which decelerating viscous forces can take effect.

In another embodiment of the invention, the device is able to selectively dispense beer at two different flow rates. In such an embodiment a pressure-reducing element is integrated into the device along with a multi-way valve that selectively routes liquid through the pressure-reducing element. When the valve is positioned such that liquid first flows through the pressure reducer before entering the rapid beverage dispensing device, liquid is dispensed at a reduced rate, preferably the optimal rate of conventional beer dispensing faucets. When the valve is positioned such that liquid bypasses the pressure reducer, the rapid beverage dispensing device functions at its faster flow rate.

Because the rapid beverage dispensing device is capable of dispensing beer at at least twice the flow rate of conventional beer dispensing systems while still achieving optimal levels of foam, it also tends to attract attention from beverage consumers as an object of curiosity. This attraction can be heightened by forming components of the device from transparent material to allow consumers to see the beverage flowing therein.

Further advantages and features of the embodiments of the present invention will be apparent from the following detailed description of the invention in conjunction with the associated drawings.

BRIEF DESCRIPTION OF THE DRAWINGS

FIG. 8 is a perspective view of the streamlined valve member of FIG. 4 illustrating the curvature and overall shape of the liquid-facing surface of the valve shoulder.

FIG. 9 is a cross sectional perspective view of the valve neck and valve shoulder.

FIG. 10 is a schematic sectional view of a conventional beer dispensing faucet.

FIG. 14 is a perspective sectional view of yet another embodiment of the nozzle assembly where the nozzle contains four semicircular flow-straightening channels.

FIG. 15 is a sectional view of a nozzle assembly containing two semicircular flow-straightening channels.

FIG. 16 is a sectional view of a nozzle assembly containing six semicircular flow-straightening channels.

FIG. 17 is a sectional view of a nozzle assembly containing seven circular flow-straightening channels.

FIG. 23 is a schematic sectional view of a nozzle assembly with a flow redirector whose position can be longitudinally adjusted.

FIG. 24 is a schematic sectional view of the nozzle assembly of FIG. 23 with the flow redirector shown moved to a new position.

DETAILED DESCRIPTION OF PREFERRED EMBODIMENTS OF THE INVENTION

Figure 1:
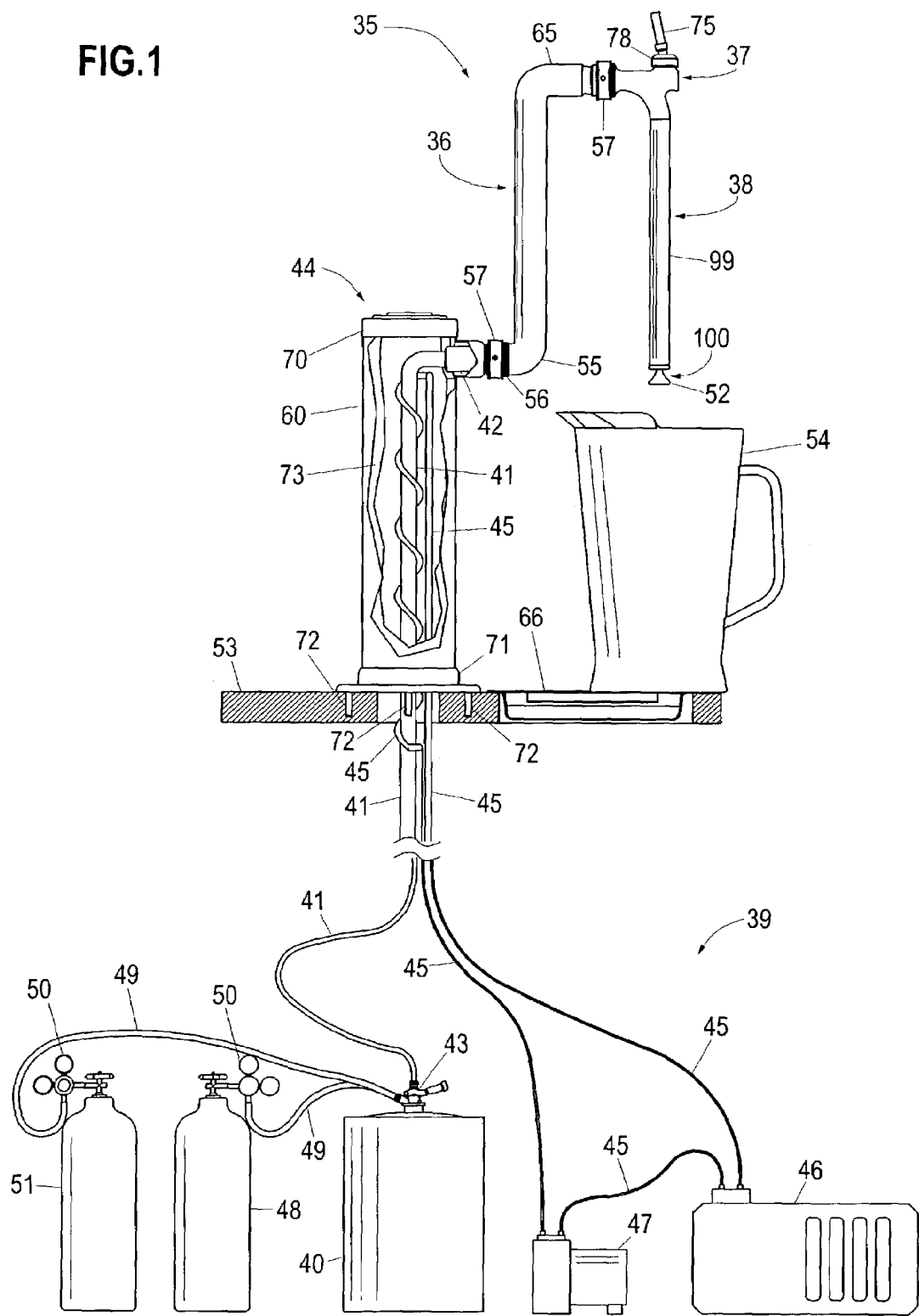
FIG. 1 is a side elevation view showing the components of a beverage dispensing system with a schematic sectional view of the first embodiment of the rapid beverage dispensing device.

As shown in FIG. 1, the rapid beverage dispensing device 35 comprises a neck assembly 36, a valve assembly 37, and a downward-extending nozzle assembly 38. In a preferred embodiment, neck assembly 36 is substantially vertical. The rapid beverage dispensing device 35 is designed to attach to a conventional pressurized beverage dispensing system, such as a beer dispensing system 39 that includes a beer keg 40 or similar beverage-containing reservoir and beverage tubing 41 for conveying a beverage from a container or beer keg 40 to the rapid beverage dispensing device 35. A shank 42 connects the rapid beverage dispensing device 35 to beverage tubing 41. Keg tapping device 43 connects beverage tubing 41 to beer keg 40. Draft dispensing tower 44 supports shank 42.

Beer produced by most major manufacturers in the United States is formulated to be stored and served optimally at approximately 38 degrees Fahrenheit (3.3 degrees Celsius). If the beer is warmer than this optimal temperature, it will tend to release too much carbon dioxide ($CO_2$) when it is dispensed. If the beer is colder than this optimal temperature, it will tend to retain too much $CO_2$ when it is dispensed and have a muted flavor. Since most systems are not able to maintain a precise temperature, a range between 36 and 40 degrees Fahrenheit (2.2 and 4.4 degrees Celsius) is generally considered acceptable. Accordingly, in one embodiment, the beer dispensing system 39 of the present invention has the ability to cool various elements of the system and maintain these elements within this acceptable temperature range.

As shown in FIG. 1, in many dispensing systems beer in the beverage tubing 41 is kept cold by circulating a cold liquid through coolant tubing 45 bundled with beverage tubing 41. Such systems typically involve refrigerating and circulating glycol through means of a glycol refrigeration device 46 and a glycol pump 47. Alternatively, some systems blow cold air through conduits containing the beverage tubing 41 as a means of keeping the beverage tubing 41 cold.

Beer contained in a beer keg 40 requires an energy source for conveying the beverage from the beer keg 40 through the entire beer dispensing system 39 to the rapid beverage dispensing device 35. Such energy is commonly provided via pressurized gas, typically pressurized $CO_2$. As shown in FIG. 1 in these systems, a tank 48 containing pressurized $CO_2$ is connected to beer keg 40 via a pressurized gas hose 49. Pressure regulating device 50 serves as a means to adjust the pressure of the $CO_2$ driving the beer through the beer dispensing system 39. In systems where a large distance exists between the beer keg 40 and the rapid beverage dispensing device 35, a second gas may be used to provide added pressure for moving the beer through the beverage tubing 41. Pressurized nitrogen ($N_2$) housed in nitrogen tank 51 may be used as this second gas. Nitrogen tank 51 is connected to beer keg 40 via a separate pressurized gas hose 49. A separate pressure regulating device 50 serves as a means to adjust the additional pressure provided by the compressed nitrogen. Some systems are able to extract nitrogen from the air, precluding the need for a separate nitrogen tank. Optionally, in another embodiment, a system may use a mechanical pump (not shown) to provide the energy required to move beer through the system in lieu of, or in addition to, pressurized gas.

The Reynolds number is a dimensionless parameter often used in fluid flow analysis. Fluid moving through round piping or tubing possessing a Reynolds number under 2100 is said to exhibit laminar flow. A system with a Reynolds number greater than 4000 is said to exhibit turbulent flow. A system that is neither laminar nor turbulent is said to exhibit transitional flow characteristics. The Reynolds number can be calculated using the following equation:

$$Re = \frac{\rho V D}{\mu}$$

where Re=Reynolds number
$\rho$=density of the liquid
V=linear velocity of the liquid
D=diameter of the tubing
$\mu$=viscosity of the liquid The pressure drop experienced by liquid moving through the rapid beverage dispensing device 35 is one of several parameters that determine the flow rate at which beer moves through the beer dispensing system 39. The flow rate is also influenced by the length, diameter and roughness of the beverage tubing 41, the height differential between the beer keg 40 and the rapid beverage dispensing device 35, and the energy provided by the pressurized $CO_2$ and/or $N_2$. In particular, for fully developed laminar liquid flow, the flow rate can be determined according to the following equation:

$$Q = \frac{\pi D^4 \Delta p}{128 \mu l}$$

where Q=volumetric flow rate
D is the diameter of the beverage tubing 41
$\Delta p$=the pressure differential between the beer keg 40 and the rapid beverage dispensing device 35
$\mu$=the viscosity of the beer or other liquid being dispensed
l=the length of beverage tubing 41 through which the beer flows While the target flow rate for conventional beer dispensing faucets is one U.S. gallon (3.785 liters) per minute, the rapid beverage dispensing device 35 has a target flow rate of at least twice that rate. Regardless of whether beer is flowing at one gallon per minute or three gallons per minute, for beverage tubing 41 possessing an inside diameter of under 1 inch, flow through the beverage tubing 41 is rarely completely laminar. Under these circumstances, the following equation applies:

$$h_L = f \frac{l}{D} \frac{V^2}{2g}$$

where
$h_L$=head loss between sections 1 and 2 of the system
f=friction factor (function of beverage tubing 41 roughness and Reynolds number)
l=length of beverage tubing 41
D=diameter of beverage tubing 41
V=linear velocity of the fluid
g=gravitational constant Accordingly, as the beverage tubing 41 connecting the beer keg 40 to the rapid beverage dispensing device 35 is lengthened and the diameter of the beverage tubing 41 is decreased, the amount of energy required from the pressurized $CO_2$ and/or $N_2$ must increase in order to overcome the additional pressure head loss. Additionally, the amount of energy required from the pressurized $CO_2$ must increase in order to increase the velocity of the liquid moving through the beverage tubing 41. Preferably, the beer dispensing system 39 is configured to deliver beer at an increased flow rate to the point of the shank 42 permitting the rapid beverage dispensing device 35 to provide increased pouring capacity compared with conventional systems.

Neck assembly 36 of the rapid beverage dispensing device 35 positions and supports the rapid beverage dispensing device 35 in a manner that allows for the bottom filling of a wide variety of container sizes, ranging from glasses to pitchers. To accommodate the bottom filling of such containers, the distance between the distal end 52 of nozzle assembly 38 and the top of a bar 53 or other structure directly beneath it is preferably at least as great as the height of the largest container to be filled. Preferably, there should be substantial clearance to allow a pitcher 54 to be placed directly beneath the nozzle assembly 38.

Figure 2:
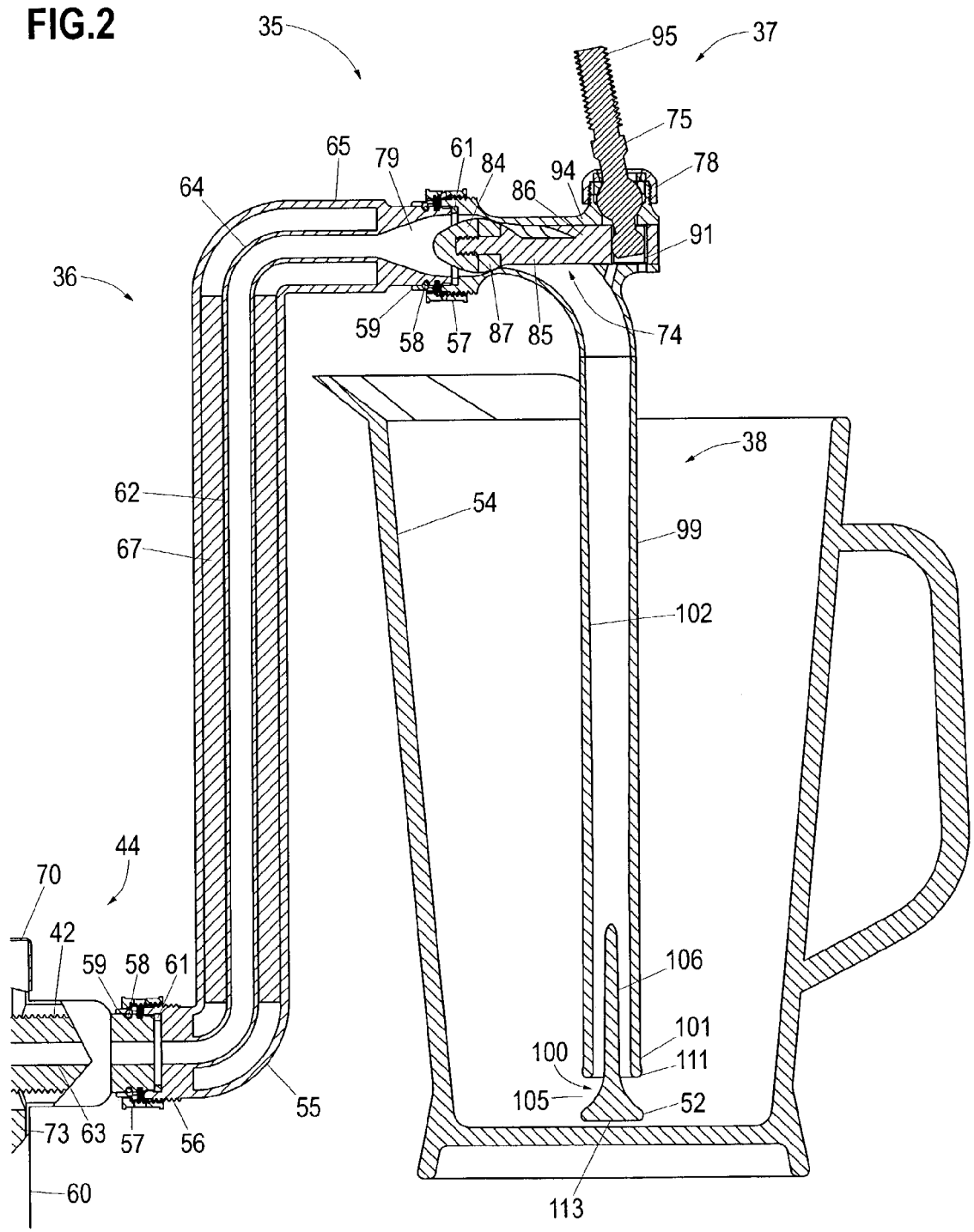
FIG. 2 is a close-up schematic sectional view of the rapid beverage dispensing device of FIG. 1.

One embodiment of the rapid beverage dispensing device 35 of the present invention is shown in more detail in FIG. 2. In the embodiment shown in FIG. 2, the lower end 55 of the neck assembly 36 has threads 56 to attach to a standard beer faucet shank 42 using a standard shank coupling nut 57, compression ring 58 and compression washer 59, although other methods of attachment, including but not limited to flanges with O-rings and quick-disconnect fittings are contemplated. Additionally, neck assembly 36 may be permanently attached to shank 42 by welding or other means. In a common bar-top installation, shank 42 is attached to a draft dispensing tower column 60. A coupling gasket 61 is positioned between the shank 42 and the neck assembly 36 to ensure a tight seal. Within neck assembly 36 is a length of neck tubing 62 for conveying liquid from the shank bore 63 to the valve assembly 37. The diameter of the neck tubing 62 preferably matches the diameter of the shank bore 63 at the point of attachment between neck assembly 36 and shank 42. Preferably, neck tubing 62 at the lower end 55 of the neck assembly 36 is initially aligned axially with the shank bore 63. In this embodiment, neck tubing 62 has about a 90 degree bend before continuing vertically within neck assembly 36. Neck tubing 62 then bends through an arc 64 of about 90 degrees near the upper end 65 of the neck assembly 36. Turbulence associated with a change in direction of liquid flow is reduced as the radius of the arc 64 increases. While an arc 64 with a large radius would decrease the turbulence associated with changing the direction of liquid flow, it would also result in the rapid beverage dispensing device 35 having a large horizontal distance between the draft dispensing tower 44 and the nozzle assembly 38. Accordingly, the radius of arc 64 is preferably small enough for the nozzle assembly 38 to be positioned directly over the bar-top drain 66. In a preferred embodiment, valve assembly 37 is attached to the upper end 65 of the neck assembly 36 such that liquid is able to move through the neck tubing 62 and into the valve assembly 37 without leakage. Additionally, neck tubing 62 in the upper end 65 of the neck assembly 36 may increase in inside diameter as it approaches the valve assembly 37 such that the inside diameter of the neck tubing 62 matches the inside diameter of the valve housing 94 at the point where the neck assembly 36 and the valve assembly 37 are joined.

Because neck assembly 36 is exposed to the ambient environment, beer residing in the neck tubing 62 during period of system inactivity can become undesirably warm. To maintain beer in the neck tubing 62 at an appropriate serving temperature, neck assembly 36 may be filled with insulation 67. In lieu of, or in addition to insulation 67, the neck assembly 36 may be cooled with glycol by extending coolant tubing 45 into neck assembly 36 (not shown).

Figure 3:
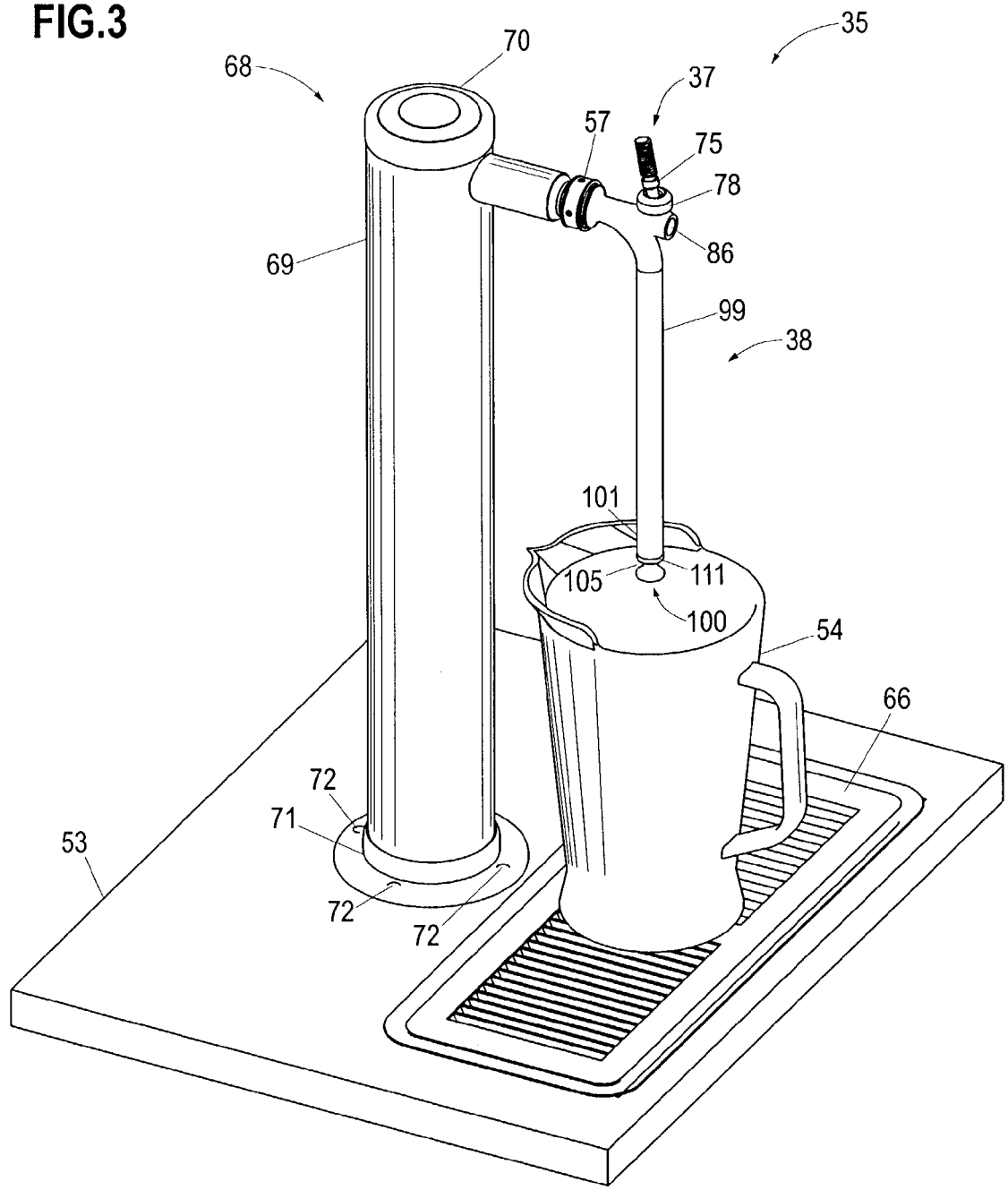
FIG. 3 is a schematic perspective view of a second embodiment of the rapid beverage dispensing device where the neck assembly is replaced by a tall draft dispensing tower.

As shown in FIG. 3, in another embodiment of this invention, the neck assembly 36 of the rapid beverage dispensing device 35 is replaced with a tall draft dispensing tower assembly 68 consisting of a tall draft dispensing tower column 69, a draft dispensing tower cover 70, a draft dispensing tower base 71, mounting screws 72, a shank 42, and column insulation 73. In this embodiment, the valve assembly 37 attaches to a shank 42 affixed to the tall draft dispensing tower column 69. Valve assembly 37 may be attached to shank 42 using shank coupling nut 57, compression ring 58, compression washer 59, and coupling gasket 61, although other means, including flanges with O-rings and quick-disconnect fittings, are contemplated. The distance between the bar top 53 and the shank 42 is such that the distance between the distal end 52 of the nozzle assembly 38 and the bar top 53 is greater than the height of a standard pitcher 54. In this embodiment, no neck assembly is exposed to the ambient atmosphere and beer maintained at pressure upstream from the valve assembly 37 remains insulated from the ambient atmosphere within the tall draft dispensing tower assembly 68. Additionally, in this embodiment, the diameter of the shank bore 63 may gradually increase along its length such that, at one end, the diameter of the shank bore 63 is equal to the diameter of the beverage tubing 41, and that the diameter of the shank bore 63 matches the inside diameter of the valve housing 94 at the point where the valve assembly 37 attaches to the shank 42.

Figure 4:
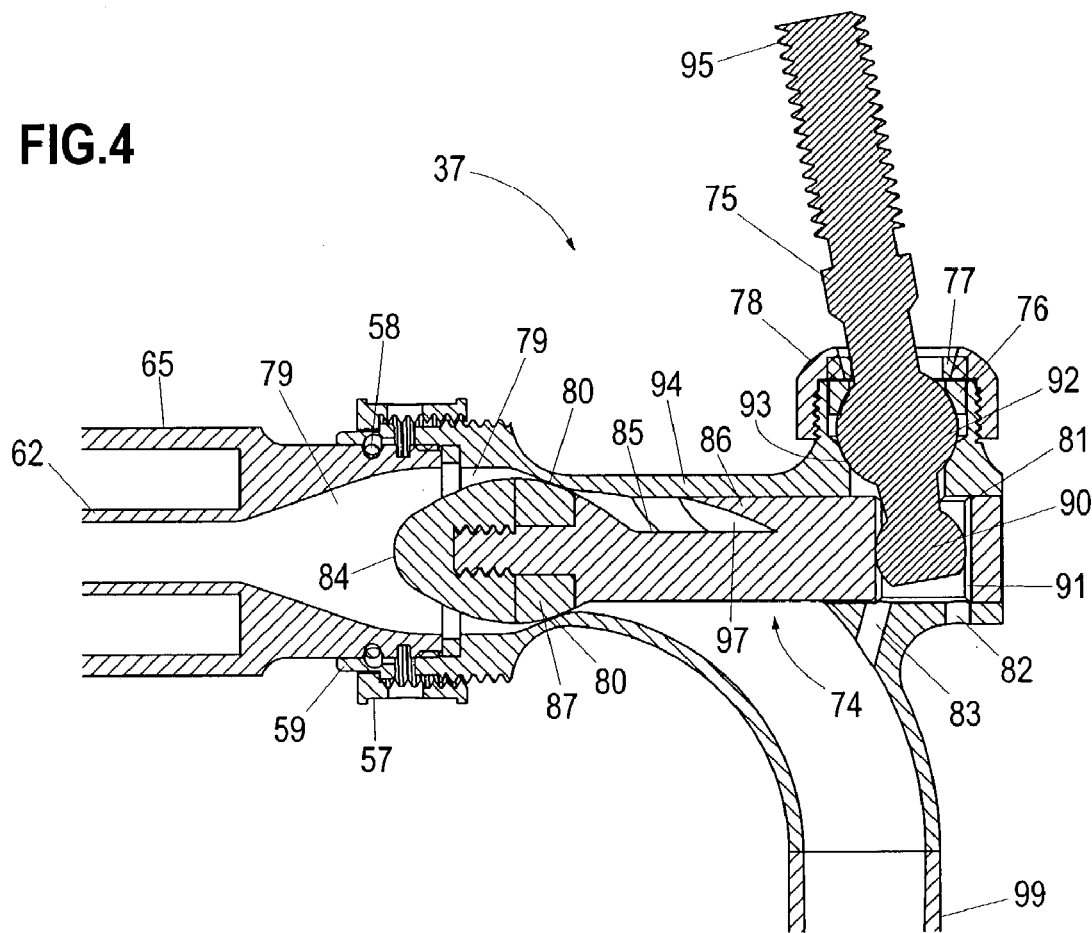
FIG. 4 is a close-up schematic sectional view of the valve assembly of FIG. 2 with the valve shown in the closed position.

In one embodiment, shown in FIG. 4, valve assembly 37 comprises valve member 74, handle lever 75, friction ring 76, bonnet washer 77, compression bonnet 78, valve chamber 79, valve seat 80, valve shoulder guide 81, exterior air vent hole 82 and interior air vent hole 83. Valve member 74 may comprise valve head 84, valve neck 85, valve shoulder 86, and seat washer 87. Valve neck 85 may be affixed to valve head 84 by any means known. Preferably, valve neck 85 is affixed to valve head 84 by a threaded means such that the two parts can be dissembled. Seat washer 87 may be held in place between valve head 84 and valve neck 85. The overall shape of the assembled valve head 84, seat washer 87 and valve neck 85 is streamlined so as to minimally disturb the liquid flowing around it. Accordingly, the liquid-facing outer surface 88 of seat washer 87 is contoured to blend smoothly, preferably tangentially, with the outer surface 89 of the valve head 84. Additionally, the liquid-facing outer surface 88 of the seat washer 87 is contoured to blend smoothly, preferably tangentially with valve neck 85.

Figure 5:
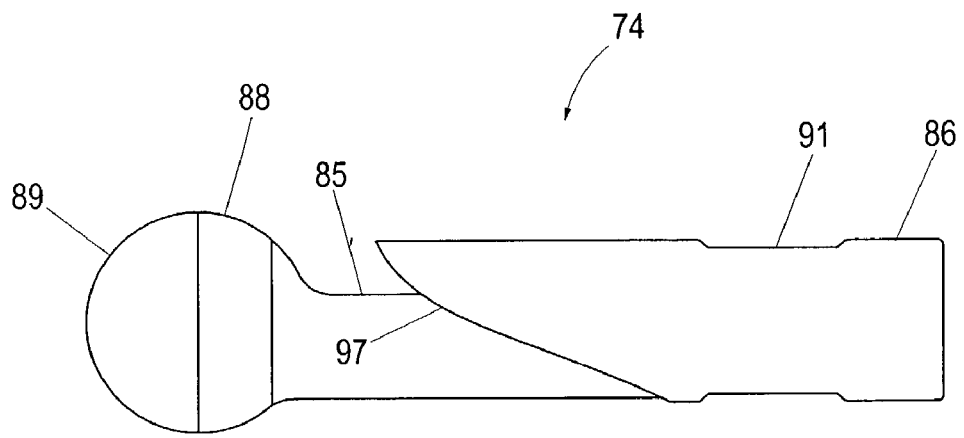
FIG. 5 is a side elevation view of another embodiment of a streamlined valve member for use in the valve assembly of FIG. 2.
Figure 6:
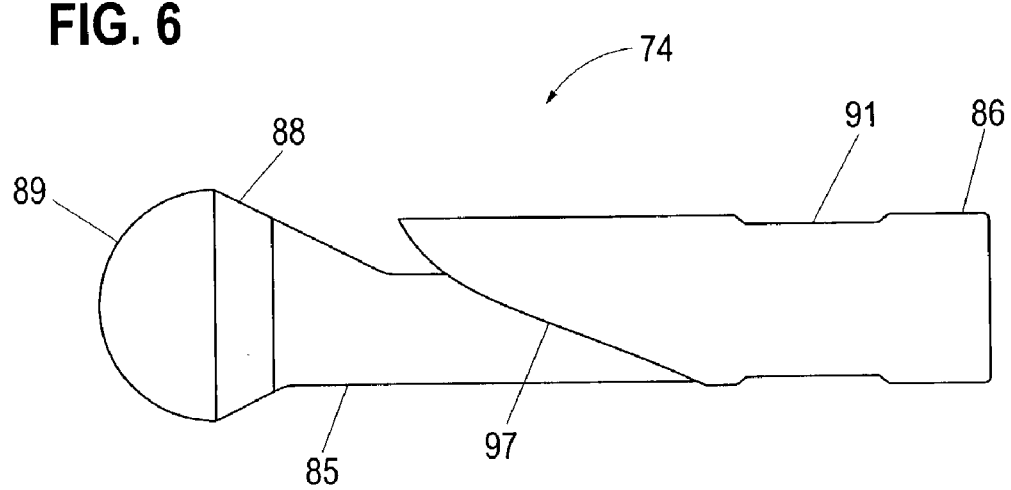
FIG. 6 shows a side elevation view of yet another embodiment of a streamlined valve member for use in the valve assembly of FIG. 2.

Other embodiments of valve member 74 are shown in FIG. 5 and FIG. 6. In these embodiments, valve head 84 is generally spherical or elliptical in nature, the outer surface 88 of seat washer 87 is contoured to generally blend smoothly with the outer surface 89 of the valve head 84. Also, the outer surface 88 of seat washer 87 is contoured to generally blend smoothly into the valve neck 85. As shown in FIG. 4, valve shoulder 86 may be sized to slide longitudinally into the valve shoulder guide 81 with a tight circumferential tolerance so as to keep the entire valve member 74 aligned axially with respect to the valve chamber 79. The distal end 90 of handle lever 75 fits into the valve shoulder slot 91. A ball joint 92 built into the handle lever 75 nests in the ball seat 93 that is part of the valve housing 94. A friction ring 76 and bonnet washer 77 fit circumferentially around the top of ball joint 92. A compression bonnet 78 may also fit circumferentially around the handle lever 75 and is held in place via threads in the compression bonnet 78 and threads built into the valve housing 94. When threaded into place, compression bonnet 78 pushes against the friction ring 76 and the bonnet washer 77 forming a seal that prevents beer from leaking out of the valve assembly 37 through the ball seat 93.

FIG. 4 illustrates the valve assembly 37 with the valve member 74 in the closed position. In this position, the proximal, threaded end 95 of handle lever 75 may be angled toward valve head 84. Since handle lever 75 pivots about its ball joint 92, in this valve-closed position, the distal end 90 of the handle lever 75 is angled away from the valve head 84, pulling the valve member 74 longitudinally until the seat washer 87 comes into contact with the valve seat 80, forming a seal that cuts off the flow of liquid. In this position, liquid in the valve chamber 79 and throughout the system will likely be at a pressure greater than the ambient atmospheric pressure to prevent $CO_2$ from coming out of solution while the system is not pouring beer. Accordingly, pressure from the liquid in the valve chamber 79 combined with the frictional forces acting between the valve shoulder 86 and the valve shoulder guide 81 and among the valve shoulder slot 91, the friction ring 76, the bonnet washer 77, the compression bonnet 78 and the handle lever 75 are sufficient to hold the valve member 74 in its closed position. Consequently, despite the pressure of the liquid upstream of the valve member 74, no springs, locks, actuators or other components applying an active force to the valve member 74 are required to maintain the valve member 74 in its closed position. Additionally, with the valve member 74 in the closed position, the valve shoulder slot 91 completes a channel between the exterior air vent hole 82 and the interior air vent hole 83 allowing air to enter the upper part of the nozzle 99 to facilitate more rapid and complete draining of any liquid in the nozzle assembly 38 the moment the valve member 74 is moved into the closed position.

To open the valve member 74, the threaded end 95 of the handle lever 75 is moved forward, in a direction generally away from the valve seat 80. As the handle lever 75 is moved in this manner, it pivots within the ball seat 93 about the center of its ball joint 92 causing the distal end 90 of the handle lever 75 to rotate in an opposite direction. This movement of the distal end 90 of the handle lever 75 serves to slide the valve member 74 in a direction that moves the seat washer 87 away from the valve seat 80, thereby placing the valve member 74 in the open position. Forces acting on the valve head 84 from the liquid flowing around it combined with frictional forces acting between the valve shoulder 86 and the valve shoulder guide 81 and among the valve shoulder slot 91, the friction ring 76, the bonnet washer 77, the compression bonnet 78 and the handle lever 75 are sufficient to hold the valve member 74 in its open position without the need to apply a continuous active force to the handle lever 75 or valve member 74.

Figure 7:
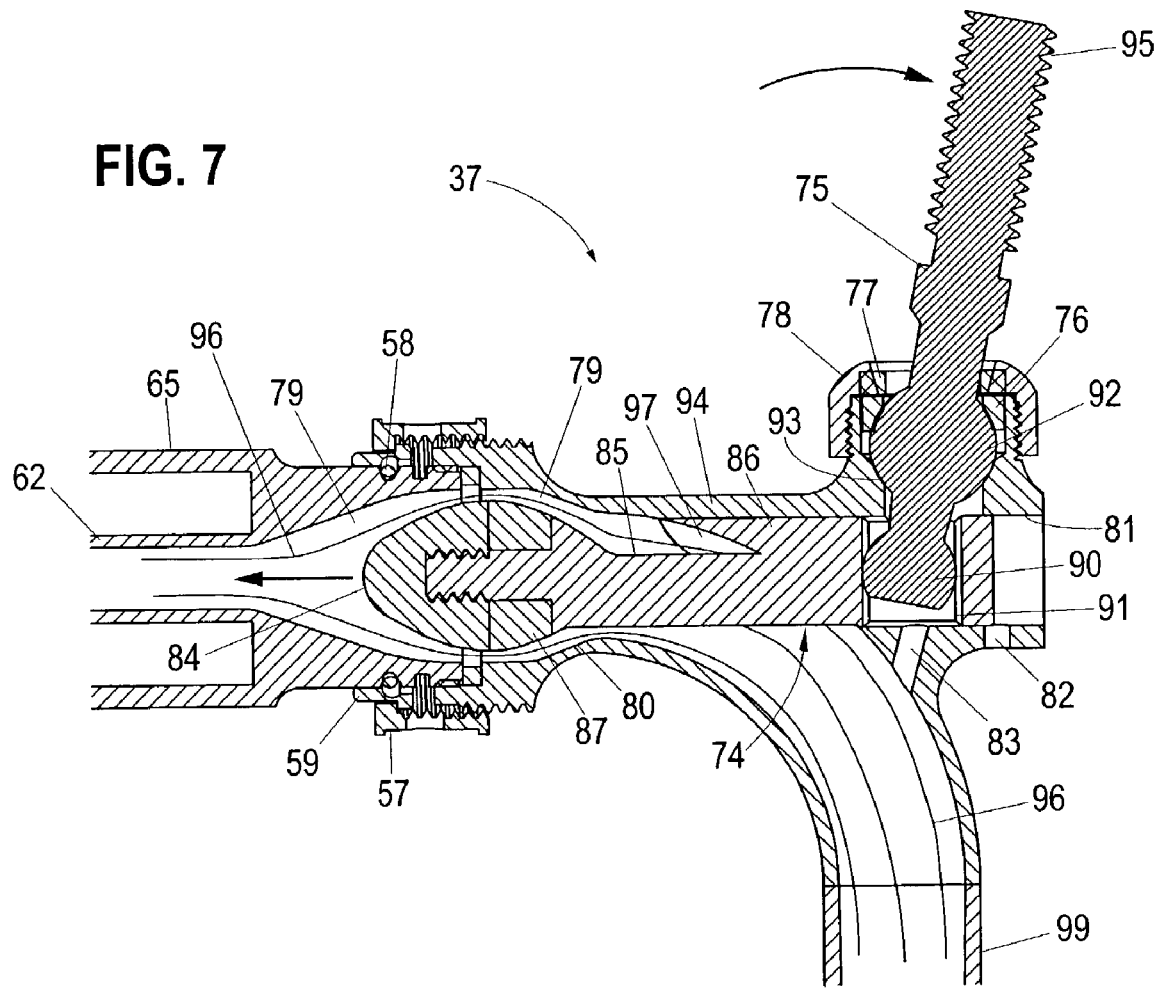
FIG. 7 is a sectional schematic view of the valve assembly of FIG. 4 with the valve shown in the open position.

Preferably, disturbances to liquid flow are minimized by a valve assembly 37 which is as streamlined as possible. As illustrated by the liquid flow lines 96 in FIG. 7, liquid flowing through the valve assembly 37 is guided in an arcing manner into the nozzle assembly 38 which is oriented in a generally downward direction. Accordingly, the valve assembly 37 must not only serve to start and stop the flow of liquid, but also to guide the liquid into the nozzle 99 while causing as little liquid flow disturbance as possible. As shown in FIG. 8, to facilitate a smooth redirection of liquid flow, the liquid-facing surface 97 of the valve shoulder 86 is contoured to match the curvature of the interior surface of the valve housing 94 when the valve member 74 is in its open position. In particular, in the embodiment shown here, the interior surface of the valve housing 94 near the valve shoulder 86 is generally the shape of a portion of an arced cylinder. That is, the liquid-facing surface 97 of the valve shoulder 86 is generally concave in shape and posses two radii of curvature. The first radius matches the large radius of the arc formed by the valve housing 94 that guides the liquid into the nozzle 99. The second radius of curvature is perpendicular to the first and matches the inside radius of the valve housing 94 at the point where the valve assembly 37 and the nozzle 99 are joined. Alternatively, the liquid-facing surface 97 of the valve shoulder 86 may possess only the first radius of curvature, in which case the liquid-facing surface 97 of the valve shoulder 86 will still direct liquid flow in a streamlined manner into the nozzle 99. Additionally, the liquid-facing surface 97 of the valve shoulder 86 may also be planar, in which case the edges of such a plane should be flush with the interior surface of the valve housing 94 when the valve member 74 is in its open position and the plane sloped in a manner to efficiently direct liquid flow into the nozzle 99. In contrast, as illustrated in FIG. 10, the liquid-facing surface 97 of a valve shoulder 86 found in a conventional beer dispensing faucet 98 is blunt and generally vertically planar. Furthermore, such a design results in liquid that is abruptly redirected as indicated by liquid flow lines 96. Such abrupt redirection of liquid can cause turbulence.

Since some of the liquid flowing through the valve chamber 79 must pass the valve neck 85 on its way into the nozzle assembly 38, the cross section of the valve neck 85, illustrated in FIG. 9, is streamlined for liquid flow in this direction.

Alternatively to the above described embodiment, which assumes manual movement of the valve member 74, the energy required to move the valve member 74 between its open and closed positions may be provided by an automatic or motor-operated means. For instance, in one embodiment, a linear actuator connected to the valve shoulder 86 may replace the function of the pushing and pulling of the handle lever 75 in moving the valve member 74 from its closed position to its open position and back. Additionally, the valve member 74 may be moved via electromagnetic means, in a manner similar to the solenoids used to control water flow in household appliances. Also, a geared or other rotary valve movement mechanism may also function to move the valve member 74 between its closed and open positions. Energy for rotating such gears may be provided by electromechanical or manual means.

Preferably, liquid flowing through valve assembly 37 is directed immediately into the nozzle assembly 38, as shown in FIG. 2. Preferably, nozzle assembly 38 comprises a downward-extending nozzle 99 and a liquid dispersion member or flow redirector 100 positioned near the lower end 101 of nozzle 99. Liquid flowing past the valve assembly 37 into the nozzle assembly 38 will tend to accelerate due to the effects of gravity. Nozzle assembly 38 fulfills four primary functions. First, viscous forces acting between the nozzle interior surface 102 and the liquid serve to slow the velocity of the liquid flow, somewhat counteracting the acceleration of the liquid due to gravity. Second, the nozzle interior surface 102 is shaped so as to minimize the chance of air moving up into the system when valve member 74 is in its open position. A solid, air-free liquid stream serves to minimize foaming of the liquid within the nozzle assembly 38. Third, the flow redirector 100 serves to redirect the flow of liquid exiting the nozzle assembly 38 in a manner that minimizes the turbulence and foaming caused when the liquid impacts the inside surface of the container being filled. Preferably, nozzle assembly 38 is long enough so that the flow redirector 100 is able to reach the bottom of the largest container to be dispensed, allowing for the filling of containers at or near their bottoms. In a preferred embodiment, nozzle assembly 38 is from about 3 inches (7.62 cm) to about 15 inches (38.1 cm) in length. More preferably, nozzle assembly 38 is from about 4 inches (10.16 cm) to about 12 inches (30.48 cm) in length. Still more preferably, nozzle assembly 38 is from about 8 inches (20.32 cm) to 10 inches (25.4 cm) in length.

Figure 11:
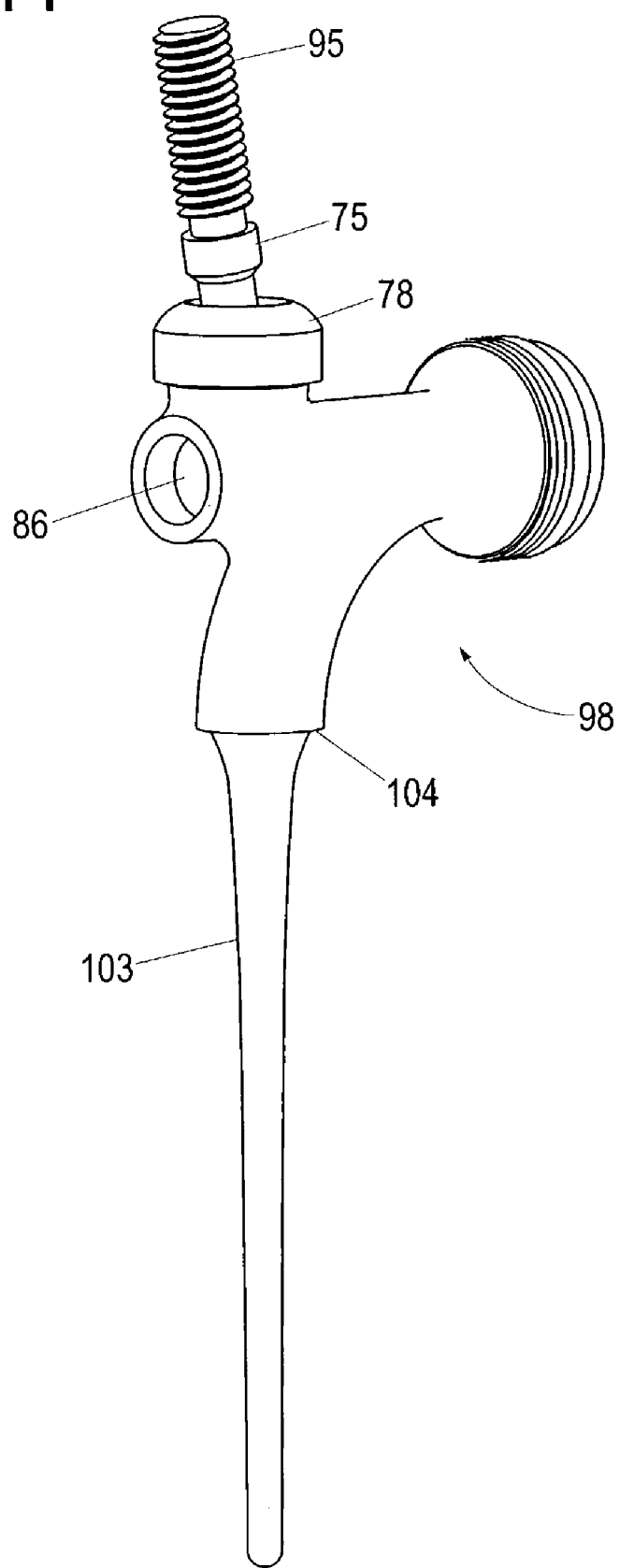
FIG. 11 is an illustration of the gravitational effects on liquid flowing from a conventional faucet.

A liquid stream 103 flowing from a conventional faucet 98 is shown in FIG. 11. In the absence of a nozzle 99, the velocity of liquid exiting faucet 98 increases as the liquid falls due to gravity. This acceleration results in a decreasing cross sectional area of the liquid stream 103 as the liquid falls farther and farther away from the faucet 98. The general shape of this profile is parabolic and its specific profile depends on the flow rate of the liquid and the diameter of the faucet outlet 104. Using Bernoulli's equation along with basic geometry, the cross sectional area of the liquid stream 103 at a given distance from the faucet outlet 104 can be calculated. According to Bernoulli's equation:

$$p_1 + \frac{1}{2}\rho V_1^2 + \rho g z_1 = p_2 + \frac{1}{2}\rho V_2^2 + \rho g z_2$$

where $p_1$, $p_2$ is the liquid pressure at the faucet outlet 104 and at some given distance from the faucet outlet 104, respectively $\rho$ is the density of the liquid $V_1$, $V_2$ is the linear velocity of the liquid stream 103 at the faucet outlet 104 and at some given distance from the faucet outlet 104, respectively g is the acceleration due to gravity $z_1$ and $z_2$ refer to points at the faucet outlet 104 and some given distance from the faucet outlet 104, respectively Since a free flowing liquid stream 103 is at atmospheric pressure, $P_1 = P_2 = 0$. Setting $z_1 = 0$, $Z_2 = h$ and renaming $V_2$ as $V_0$ and $V_1$ as $V_h$ provides as equation for $V_h$ in terms of h, where $V_h$ is the linear velocity of the liquid stream 103 at a vertical distance, h, beneath the faucet outlet 104.

$$0 + \frac{1}{2}\rho V_h^2 + \rho g * 0 = 0 + \frac{1}{2}\rho V_0^2 + \rho g h$$

$$\frac{1}{2}\rho V_h^2 = \frac{1}{2}\rho V_0^2 + \rho g h$$

$$V_h^2 = V_0^2 + 2gh$$

$$V_h = \sqrt{V_0^2 + 2gh}$$

where $V_0$ is the linear velocity of the liquid stream 103 at the faucet outlet 104.

The flow rate of a liquid stream 103 can be related to the liquid stream 103 linear velocity and the liquid stream 103 cross sectional area according to the following equation:

$$Q = A_0 V_0$$

where Q is the flow rate of the liquid $A_0$ is the cross sectional area of the faucet outlet 104

$V_0$ is the linear velocity of the liquid stream 103 at the faucet outlet 104.

Solving for $V_0$ and substituting in the equation for $V_h$ yields the following:

$$V_h = \sqrt{\left(\frac{Q}{A_0}\right)^2 + 2gh}$$

For a circular faucet outlet 104, $A_0$ can be expressed in terms of $D_0$, the diameter of the faucet outlet 104:

$$A_0 = \pi\left(\frac{D_0}{2}\right)^2$$

$$A_0 = \frac{\pi D_0^2}{4}$$

One more substitution solves for $V_h$ in terms of $D_0$:

$$V_h = \sqrt{\left(\frac{Q}{\frac{\pi D_0^2}{4}}\right)^2 + 2gh}$$

$$V_h = \sqrt{\left(\frac{4Q}{\pi D_0^2}\right)^2 + 2gh}$$

$$V_h = \sqrt{\frac{16Q^2}{\pi^2 D_0^4} + 2gh}$$

Additionally, since the flow rate of the liquid is constant throughout a compressionless system:

$$Q = A_h V_h$$

where Q is the volumetric flow rate of the liquid $A_h$ is the cross sectional area of the liquid stream 103 at a distance h from the faucet outlet 104

$V_h$ is the linear velocity of the liquid stream 103 at a distance h from the faucet outlet 104

Solving the above for $A_h$ and substituting in the previous definition of $V_h$, the cross sectional area of the liquid stream 103, $A_h$, can be determined as a function of its vertical distance h from the faucet outlet 104, the diameter of the faucet outlet 104 and the liquid flow rate:

$$Q = V_h A_h$$

$$A_h = \frac{Q}{V_h}$$

$$A_h = \frac{Q}{\sqrt{\frac{16Q^2}{\pi^2 D_0^4} + 2gh}}$$

Preferably, the cross sectional area profile of the nozzle assembly 38 matches the cross sectional area profile of a free-falling liquid stream 103, as calculated using the above equation. In this embodiment, the cross sectional area of the nozzle 99 gradually decreases from top to bottom. In a preferred embodiment, where a flow redirector is used, nozzle 99 widens near its distal end to accommodate the flow redirector 100, but the cross sectional area of the resulting concentric annulus preserves the continuity of this gradually decreasing cross sectional area to the point of the nozzle assembly outlet 105. As shown, the concentric annulus maintains this gradually decreasing cross sectional area through the use of a flow director whose flow redirector shaft 106 gradually increases in cross sectional area from top to bottom. Alternatively, the flow redirector 100 may have a flow redirector shaft 106 of constant diameter if the distal end of the nozzle 99 were to have a gradually decreasing cross section (not shown). A nozzle assembly 38 with a cross sectional area profile that matches the profile of a free falling liquid stream 103 serves to keep the liquid flowing through the nozzle assembly 38 in constant contact with the nozzle interior surface 102. In this manner, viscous forces acting between the liquid and the nozzle interior surface 102 serve to decelerate the liquid. Additionally, air is unable to bubble up into the nozzle assembly 38 as long as the liquid is flowing at the flow rate for which the nozzle assembly 38 is optimized.

Figure 12:
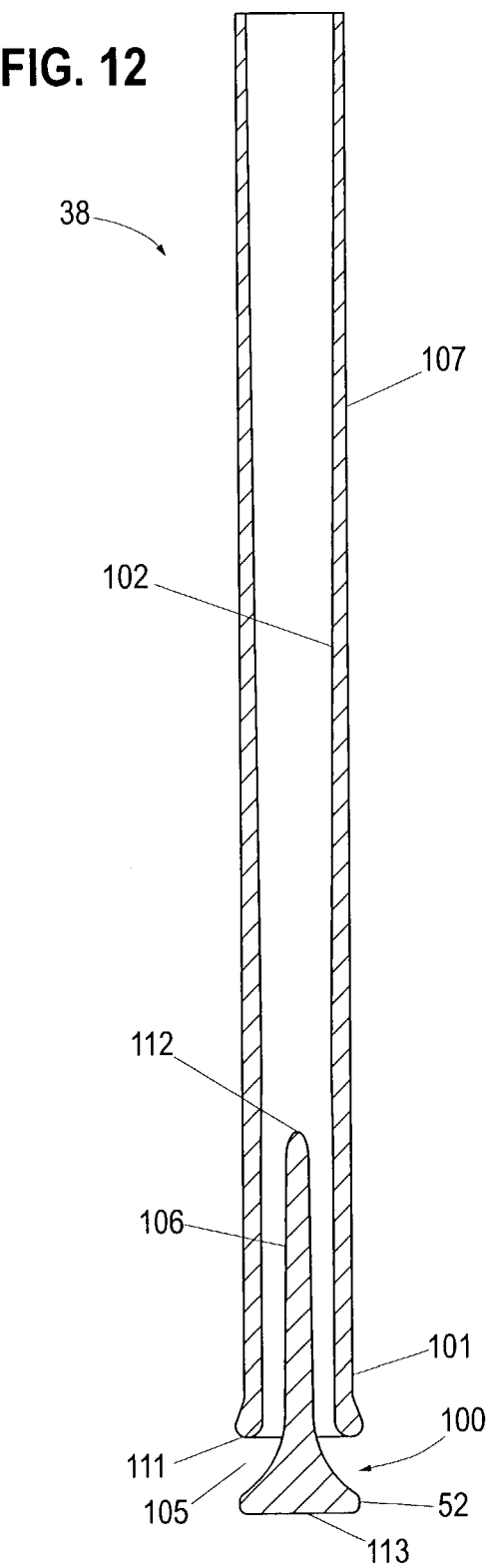
FIG. 12 shows a schematic sectional view of another embodiment of the nozzle assembly where the parabolic profile of the nozzle cross sectional area of FIG. 2 is approximated by nozzle with a linear taper.

In an alternative embodiment of the nozzle assembly 38, shown in FIG. 12, a nozzle 107 with a linear taper approximates the gradually decreasing cross sectional area of nozzle 99 with a cross-sectional area profile that matches that of a free-flowing liquid stream.

Figure 13:
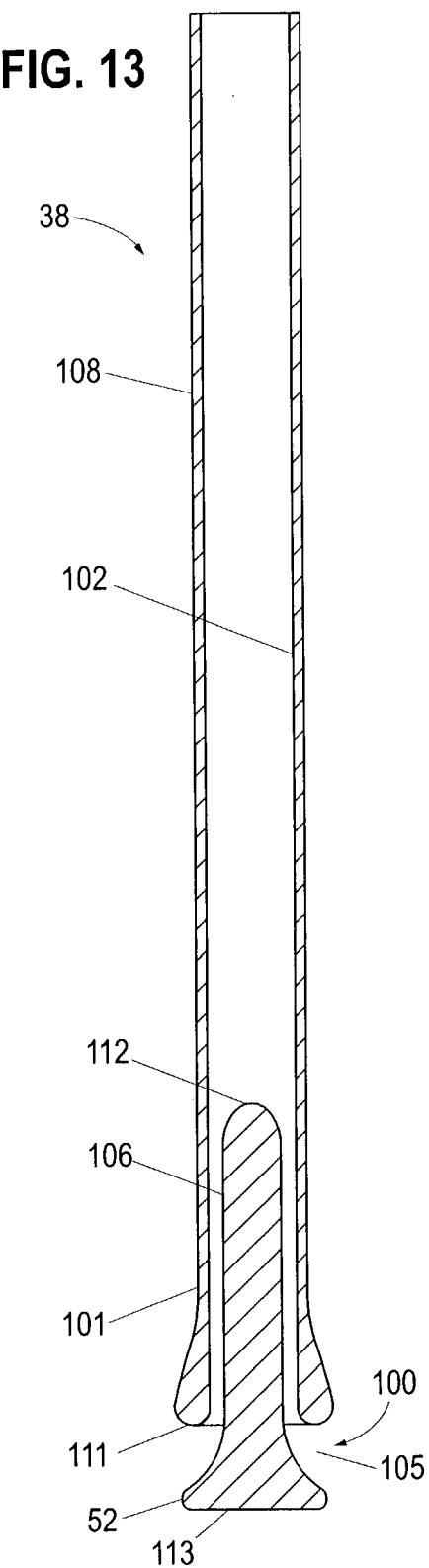
FIG. 13 shows a schematic sectional view of another embodiment of the nozzle assembly where the parabolic profile of the nozzle cross sectional area of FIG. 2 is approximated by a cylindrical nozzle.

In another embodiment of the nozzle assembly 38, shown in FIG. 13, a cylindrical nozzle 108 is used. In this embodiment, the cross sectional area of the cylindrical nozzle 108 is constant until the flow redirector 100 is introduced in which case the decrease in cross-sectional area due to the positioning of the flow redirector 100 is sufficient to prevent air from entering the cylindrical nozzle 108 while liquid is flowing. Thus, the cross sectional area of the internal passageway decreases from the liquid receiving end of the nozzle to the liquid dispensing end of the nozzle.

In still another embodiment, shown in FIG. 14, the nozzle assembly 38 contains two or more flow-straightening channels 109 that serve to reduce any lateral movement of liquid in the nozzle assembly 38 and decrease the turbulence of liquid flowing through the nozzle assembly 38. Preferably, nozzle 99 is subdivided into at least two channels 109, and preferably three to ten channels 109. More preferably, nozzle 99 is divided into four equally sized channels 109. FIG. 15, FIG. 16 and FIG. 17 illustrate, in cross-section, various embodiments of a channeled nozzle.

The Reynolds number provides an indication as to the laminar or turbulent nature of liquid flow. The Reynolds number for a nozzle 99 of circular cross-section without flow-straightening channels 109 can be expressed as follows:

$$Re = \frac{\rho V D}{\mu}$$

The Reynolds number for a non-circular conduit can be determined from the following equation:

$$Re_h = \frac{\rho V D_h}{\mu}$$

where $Re_h$ is the Reynolds number based on the hydraulic diameter. The hydraulic diameter is defined as $D_h = 4A/P$ where A is the cross-sectional area of the conduit and P is the perimeter of the conduit. For each equally sized, semicircular, wedge-shaped channel 109 in the nozzle assembly 38:

$$A = \frac{1}{n}\pi\left(\frac{D}{2}\right)^2 = \frac{1}{n}\pi\left(\frac{D^2}{4}\right)$$

$$4A = 4\left(\frac{1}{n}\right)\pi\frac{D^2}{4} = \frac{\pi D^2}{n}$$

$$P = 2\left(\frac{1}{2}D\right) + \frac{\pi D}{n} = D + \frac{\pi D}{n} = \frac{(n+\pi)D}{n}$$

$$D_h = \frac{4A}{P} = \frac{\frac{\pi D^2}{n}}{\frac{(n+\pi)D}{n}} = \left(\frac{\pi}{\pi+n}\right)D$$

$$Re_h = \frac{\rho V D_h}{\mu} = \left(\frac{\pi}{\pi+n}\right)\frac{\rho V D}{\mu}$$

where D is the inside diameter of the nozzle 99 and n is the number of equally sized, semicircular, wedge-shaped channels 109. Comparing the Reynolds number of the nozzle 99 with the channels 109 to the nozzle 99 not containing any flow-straightening channels yields the following ratio:

$$\frac{Re_h}{Re} = \frac{\left(\frac{\pi}{\pi+n}\right)\frac{\rho V D}{\mu}}{\frac{\rho V D}{\mu}} = \frac{\pi}{\pi+n}$$

Thus, the Reynolds number of liquid flowing through the nozzle assembly 38 with the flow-straightening channels 109 has been reduced by a factor of $(\pi)/(\pi+n)$ as compared to a nozzle assembly 38 without flow-straightening channels in place. As indicated, increasing the number of channels 109 would further decrease the Reynolds number of the liquid flowing through the nozzle 99. Additionally, the surfaces 110 of each flow-straightening channel 109 increase the available surface area upon which viscous forces acting between the liquid and the surfaces 110 can form, thereby further decelerating the liquid as it travels through the nozzle 99.

The nozzle assembly 38 may be insulated and/or cooled by liquid or other means known in the art, including, but not limited to foam, air, circulated glycol, circulated water and thermoelectric means. Since the nozzle assembly 38 is exposed to the ambient air, it may warm to the ambient temperature in the absence of such insulation or cooling mechanism. Extending the glycol lines of a glycol-cooled dispensing system such that they coil within the nozzle assembly 38 (not shown) may be used to keep the nozzle assembly 38 cold.

Figure 18:
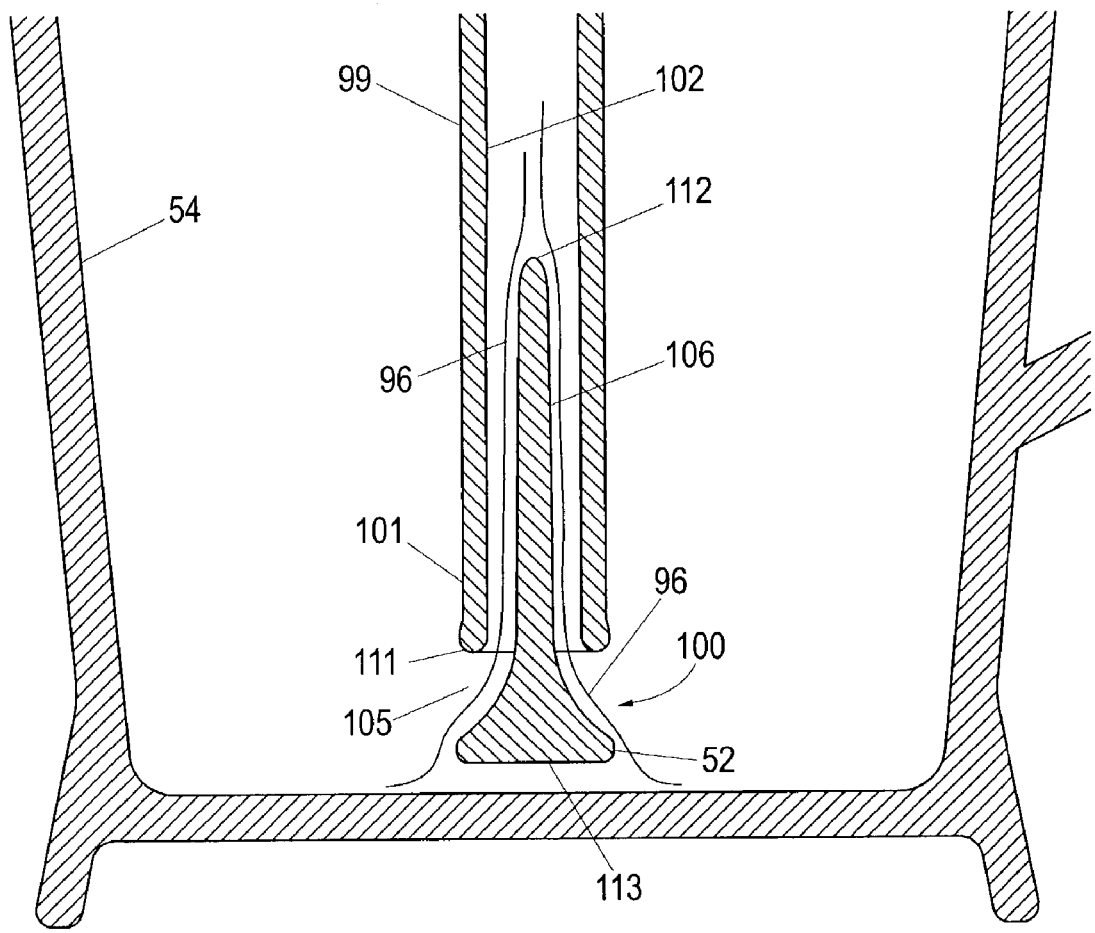
FIG. 18 is a close-up, sectional schematic view of the nozzle assembly of FIG. 2 with a container present and liquid flow lines indicating the manner in which the flow redirector redirects liquid flow.

A principal cause of excessive foaming when dispensing beer is having the beverage hit the bottom of the container at a great velocity or in an otherwise turbulent manner. Flow redirector 100 minimizes foaming by gently redirecting and dispersing liquid exiting the nozzle assembly 38 in a manner that reduces the force of impact between the liquid and the container. As shown by simulated liquid flow lines 96 in FIG. 18, liquid traveling through the nozzle assembly 38 is evenly dispersed around the flow redirector shaft 106. As liquid flows past the flow redirector 100, it is gently redirected from flowing in a generally downward direction into flowing in a radial direction. Preferably, liquid exiting the nozzle assembly 38 is dispersed radially, in an even 360-degree pattern that also possesses a downward vector. Such a pattern has been determined to minimize foaming of the beverage as it is dispensed for a wide variety of container sizes. A lip 111 at the lower end of nozzle 99 may also be present. Lip 111 is preferably rounded, although other shapes are contemplated, so as to improve the flow characteristics of liquid exiting the nozzle assembly outlet 105.

Preferably, flow redirector 100 is a streamlined object. In a preferred embodiment, the proximal end 112 of flow redirector 100 is in the shape of an elliptical dome. In this embodiment, a round flow redirector shaft 106 gradually widens towards the flow redirector base 113 so as to redirect the liquid flow with the least amount of turbulence. Preferably, the horizontal cross-section along the entire longitudinal length of the flow redirector 100 is circular, although other shapes, as long they do not substantially interfere with the flow of the liquid, are contemplated. The flow redirector base 113 is also preferably circular and flat such that the bottom of a flat-bottomed container can be positioned flush against the flow redirector base 113. However, the bottom of flow redirector base 113 may also have a somewhat concave surface as long as the peripheral edge of the bottom of the flow redirector base 113 substantially contacts the bottom of the container to be filled. The exterior surface of the flow redirector 100 is preferably smooth.

Figure 20:
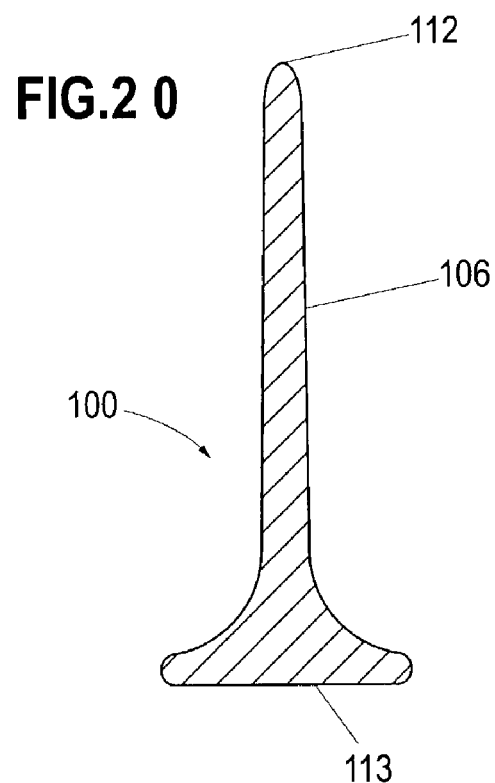
FIG. 20 is sectional view of another embodiment of the flow redirector for use in the nozzle assembly of FIG. 2.
Figure 21:
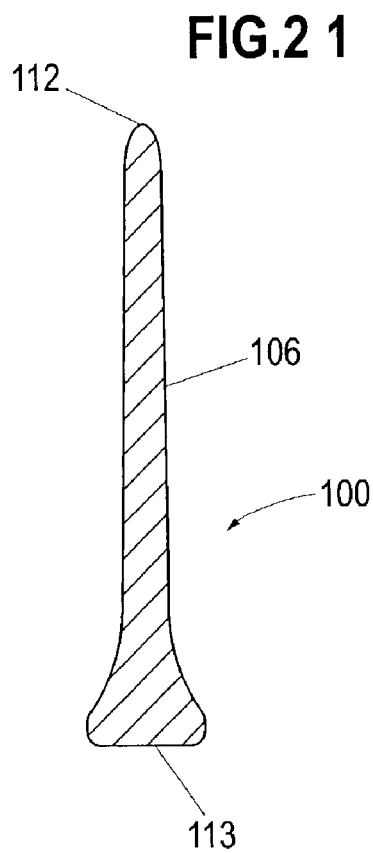
FIG. 21 is a sectional view of still another embodiment of the flow redirector for use in the nozzle assembly of FIG. 2.
Figure 22:
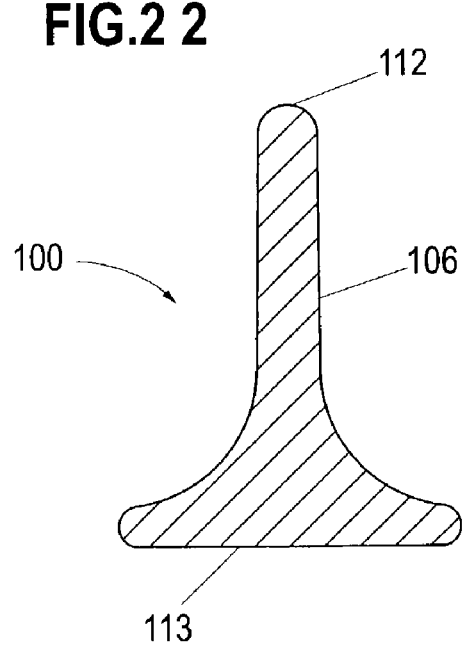
FIG. 22 is a sectional view of yet another embodiment of the flow redirector for use in the nozzle assembly of FIG. 2.

While a tall, wide flow redirector 100 would serve to decrease the turbulence caused when redirecting the liquid, such a flow redirector 100 would result in a long, wide nozzle assembly 38 that would have difficulty fitting into smaller containers. For this reason, a more compact flow redirector 100 is desirable. Preferably, the flow redirector 100 is between 0.5 inches (1.27 cm) and 8 inches (20.32 cm) when measured between its proximal end 112 and its base 113. More preferably, the flow redirector 100 is between 1 inch (2.54 cm) and 4 inches (10.16 cm) when measured along this length. Still more preferably, the flow redirector 100 is 2 inches (5.08 cm) when measured along this length. Preferably, the flow redirector base 113 measures between 0.25 inches (0.635 cm) and 5 inches (12.7 cm) at its widest point. More preferably, the flow redirector base 113 measures between 0.5 inches (1.27 cm) and 2 inches (5.08 cm) at its widest point. Additional embodiments of flow redirector 100 are illustrated in FIG. 20, FIG. 21, and FIG. 22. Many other flow redirector 100 shapes and configurations are possible that accomplish the task of reducing the amount of foaming caused when the liquid leaves the nozzle assembly 38 and impacts a container. Preferably, the flow redirector is obconical.

Figure 19:
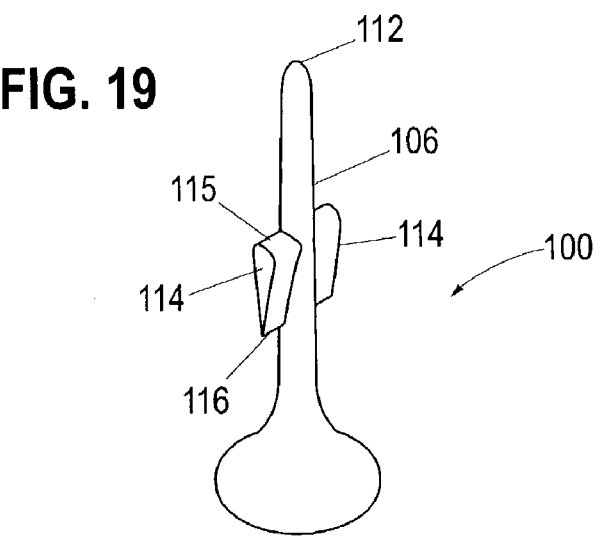
FIG. 19 is a perspective view of the flow redirector of FIG. 2.

Preferably, flow redirector 100 is generally not movable, but is removable. Flow redirector 100 may be attached to the inside of the nozzle 99 via one or more support structures 114. Support structures 114 are of sufficient strength to hold the flow redirector 100 centered along the axis of the nozzle 99, even in the presence of a liquid stream. To minimize their disturbance to liquid flow, support structures 114 are preferably streamlined and comprise a rounded proximal end 115 that gradually tapers to a point at the distal end 116. An airfoil shape, as shown in FIG. 19, has been found to minimize the turbulence caused by the support structures 114. In the case of a nozzle assembly 38 that contains flow-straightening channels 109, flow redirector 100 may not require support structures 114 to hold it in place as it may be affixed directly to the surfaces 110 forming the flow-straightening channels 109.

Flow redirector 100 is positioned longitudinally within the nozzle assembly 38 such that a nozzle assembly outlet 105 is formed between the lip 111 of the nozzle assembly 38 and the flow redirector 100 that allows liquid to leave the nozzle assembly 38 and enter the container. The size of the nozzle assembly outlet 105 must be large enough to allow liquid to rapidly exit the nozzle assembly 38, and small enough to obtain an even, radial dispersion of liquid into the container. The optimal size of the nozzle assembly outlet 105 varies with liquid flow rate, nozzle 99 diameter and the particular shape of the flow redirector 100. Preferably, the height of the nozzle assembly outlet 105 as measured as the vertical distance between the lip 111 of the nozzle 99 and flow redirector 100 is between 0.2 inches (0.508 cm) and 1.5 inches (3.81 cm). More preferably, the height of the nozzle assembly outlet 105 is between 0.35 inches (0.889 cm) and 0.6 inches (1.524 cm). Still more preferably, the height of the nozzle assembly outlet 105 is between 0.4 inches (1.016 cm) and 0.5 inches (1.27 cm).

While the height of the nozzle assembly outlet 105 may be a fixed distance, another embodiment of this invention, shown in FIG. 23 and FIG. 24, allows for fine-tuning of the specific longitudinal position of the flow redirector 100 within the nozzle assembly 38 via set screws 117 and countersunk slots 118 in the nozzle 99 allowing for longitudinal movement of the flow redirector 100 upon loosening the set screws 117. In moving the flow redirector 100 longitudinally along the axis of the nozzle assembly 38, the height of the nozzle assembly outlet 105 is changed. The set screws 117 may also be completely removed from the nozzle assembly 38 such that the flow redirector 100 can be removed from the nozzle assembly 38 for cleaning or maintenance purposes.

Figure 25:
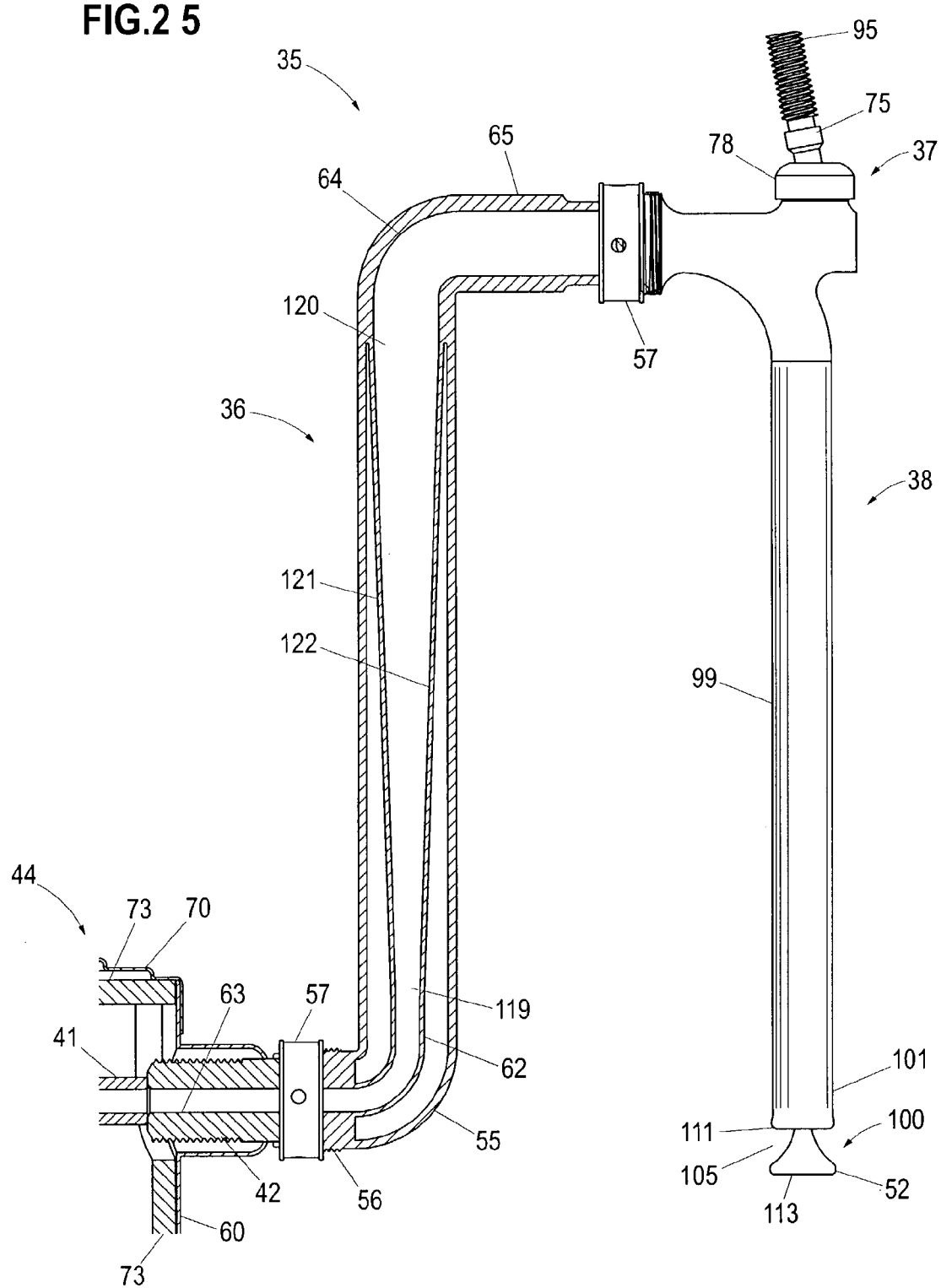
FIG. 25 is a schematic sectional view of the rapid beverage dispensing device containing a conical diffuser within its neck assembly.

In another embodiment of this invention, a diffuser 121 is placed upstream from the valve assembly 37 so as to increase the cross sectional area of liquid entering the valve assembly 37 in a manner that minimizes the amount of turbulence. Preferably, the diffuser 121 tapers from its throat end 119 to its exit end 120. In one embodiment, shown in FIG. 25, a conical diffuser 121 is positioned within the neck assembly 36 of the rapid beverage dispensing device 35. The axis of the conical diffuser 121 in this embodiment is aligned vertically within the neck assembly 36 of the rapid beverage dispense device 35, although it may also posses a radius of curvature. Preferably the divergence angle of the conical diffuser 121, as measured as the angle between the longitudinal axis of the conical diffuser 121 and the conical diffuser wall 122, is relatively small. A large divergence angle typically results in increased turbulence as the liquid is forced to expand in cross-sectional area over a short distance. To facilitate diffusion while minimizing turbulence, preferably the conical diffuser 121 possesses a divergence angle of fewer than 25 degrees. More preferably, the divergence angle is fewer than 12 degrees, and even more preferably is 8 or fewer degrees.

Figure 26:
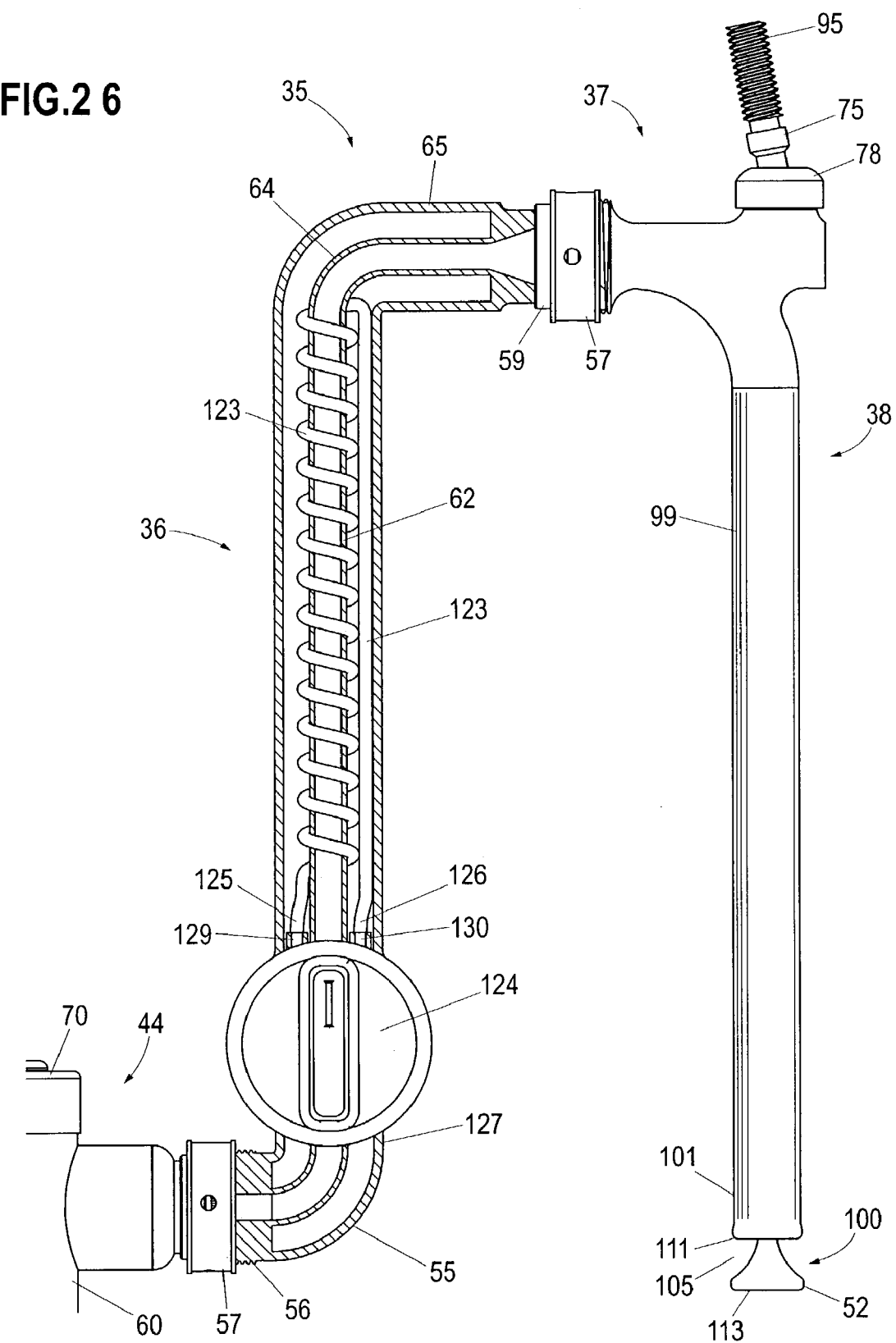
FIG. 26 is a schematic sectional view of the rapid beverage dispensing device shown with a multi-way valve and a pressure reducing element.

Under certain conditions, it may be desirable to slow the flow rate of the liquid leaving the rapid beverage dispensing device 35. In another embodiment of the present invention, shown in FIG. 26, a pressure-reducing element 123 is introduced into this system in conjunction with a multi-way valve 124 in order to optionally slow the flow rate of the liquid being dispensed. While a pressure-reducing element 123 can take many forms, preferably, the pressure-reducing element 123 consists of a length of narrow diameter tubing. The pressure-reducing element 123 is coiled within the neck assembly 36 of the rapid beverage dispensing device 35 so as to minimize its space requirements.

Figure 27:
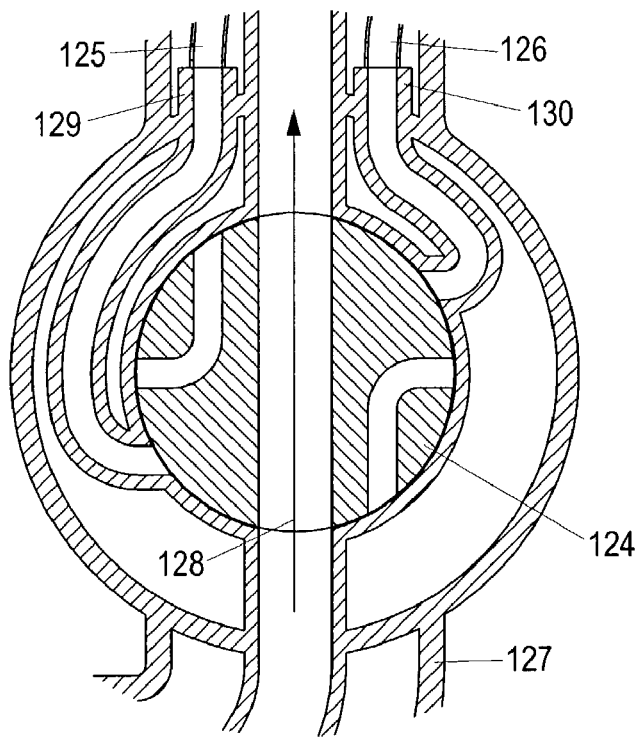
FIG. 27 is a close-up, schematic sectional view of the multi-way valve of FIG. 26 shown with the valve routing liquid in a manner that bypasses the pressure-reducing element.

The inbound end 125 and outbound end 126 of the pressure-reducing element 123 are connected to a multi-way valve 124 positioned at the neck base 127 of the rapid beverage dispensing device 35. As shown in one embodiment in FIG. 27, in one position, the multi-way valve 124 provides an unimpeded, full-port opening between the rapid beverage dispensing device 35 and the rest of the beer dispensing system 39. Liquid flow arrows 128 indicate the path of liquid flow through the multi-way valve 124. In this position, the liquid flow completely by passes the pressure-reducing element 123 and liquid is dispensed from the rapid beverage dispensing device 35 at its normal flow rate as if the pressure-reducing element 123 were not present.

Figure 28:
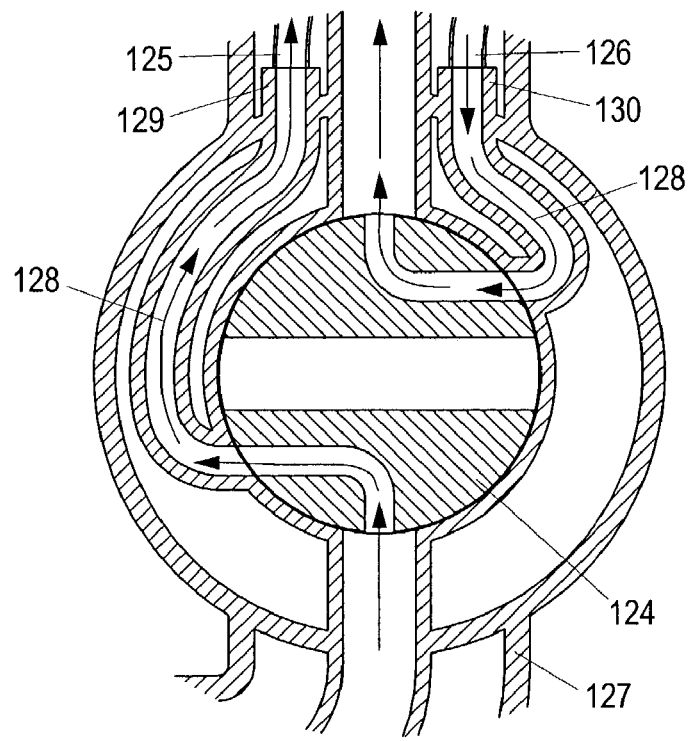
FIG. 28 is a close-up, schematic sectional view of the multi-way valve of FIG. 26 shown with the valve routing liquid through the pressure-reducing element prior to directing liquid to the rapid beverage dispensing device.

As shown in FIG. 28, in its other position, the multi-way valve 124 directs liquid through the pressure-reducing element 123 on its way through the rapid beverage dispensing device 35. In this position, liquid entering the multi-way valve 124 is directed to the outbound valve port 129 which is attached to the inbound end 125 of the pressure-reducing element 123. Energy from the beer dispensing system 39 continues to move the liquid through the entire length of the pressure-reducing element 123 before the liquid re-enters the multi-way valve 124 through its inbound valve port 130 which directs the liquid from the outbound end 126 of the pressure-reducing element 123 through the rapid beverage dispensing device 35. Because the liquid re-entering the multi-way valve 124 has experienced a drop in pressure, the liquid re-enters the rapid beverage dispensing device 35 at a reduced flow rate, preferably the optimal flow rate of a conventional beer dispensing faucet.

It is therefore intended that the foregoing detailed description be regarded as illustrative rather than limiting, and that it be understood that it is the following claims, including all equivalents, that are intended to define the spirit and scope of the invention.

The invention claimed is:

1. A beverage dispensing apparatus for dispensing a pressurized beverage comprising a nozzle through which the pressurized beverage at least initially exits to atmospheric conditions having an internal passageway, a liquid receiving end adapted to attach as the end element of a pressurized beverage dispensing system, and a liquid dispensing end that dispenses the pressurized beverage at least initially to atmospheric conditions, wherein the cross-sectional area of the internal passageway of the nozzle decreases from the liquid receiving end to the liquid dispensing end such that the cross sectional area profile of the internal passageway approximates the cross sectional area profile of a free falling stream of liquid at ambient pressure.

2. The beverage dispensing apparatus of claim 1 wherein the decrease in cross-sectional area of the internal passageway is continuous.

3. The beverage dispensing apparatus of claim 2 wherein the length of the nozzle is at least about three inches.

4. The beverage dispensing apparatus of claim 3 wherein liquid flowing through the nozzle is in substantially constant contact with the surface of the internal passageway.

5. The beverage dispensing apparatus of claim 1 comprising a liquid dispersion member having a liquid receiving end and a liquid dispersing end, the liquid dispersing end extending from the liquid dispensing end of the nozzle and radially dispersing the beverage exiting the liquid dispensing end of the nozzle.

6. The beverage dispensing apparatus of claim 5 wherein the liquid dispersion member is removably supported within the liquid dispensing end of the internal passageway of the nozzle.

7. The beverage dispensing apparatus of claim 5 wherein the liquid dispersion member further comprises a stem of substantially uniform circumference and a substantially obconical liquid dispersing surface.

8. The beverage dispensing apparatus of claim 7 wherein the liquid dispersing surface of the liquid dispersion member extends from the liquid dispensing end of the nozzle from about 0.2 inches to about 1.5 inches.

9. The beverage dispensing apparatus of claim 8 wherein the liquid dispersing surface of theliquid dispersion member extends from the liquid dispensing end of the nozzle from about 0.35 inches to about 0.6 inches.

10. The beverage dispensing apparatus of claim 9 wherein the liquid dispersing surface of the liquid dispersion member extends from the liquid dispensing end of the nozzle from about 0.4 inches to about 0.5 inches.

11. The beverage dispensing apparatus of claim 5 wherein the distance that the liquid dispersing surface of the liquid dispersion member extends from the liquid dispensing end of the nozzle is adjustable.

12. The liquid dispersion member of claim 7 wherein the liquid dispersing surface has a gradually decreasing slope.

13. The liquid dispersion member of claim 12 wherein the liquid dispersing surface disperses liquid from the nozzle at an angle to the longitudinal axis of the nozzle.

14. The liquid dispersion member of claim 13 wherein the dispersing surface disperses liquid from the nozzle substantially perpendicular to the axis of the liquid dispersion member.

15. The beverage dispensing apparatus of claim 1 wherein the cross-sectional area profile of the internal passageway gradually decreases from top to bottom according to the following formula:

$$A_h = \frac{Q}{\sqrt{\frac{16Q^2}{\pi^2 D_0^4} + 2gh}}$$

16. The beverage dispensing apparatus of claim 1 wherein the internal passageway of the nozzle comprises at least two vertical channels.

17. The beverage dispensing apparatus of claim 16 wherein the internal passageway of the nozzle comprises four vertical channels.

18. A beverage dispensing system comprising:
a container holding a carbonated beverage;
an energy source that pressurizes the carbonated beverage in the container;
a valve in fluid communication with the beverage in the container, the valve having an open position and a closed position;
a nozzle having a liquid receiving end in fluid communication with the valve, an internal passageway having a cross sectional area through which said carbonated beverage flows when said valve is in the open position, and a liquid dispensing end having an opening through which the carbonated beverage at least initially exits to atmospheric conditions, wherein the cross-sectional area of the internal passageway of the nozzle decreases from the liquid receiving end to the liquid dispensing end and where the nozzle is configured such that the carbonated beverage flowing through the nozzle substantially fills the entire cross-sectional area of the nozzle and is in substantially constant contact with the surface of the internal passageway from the liquid receiving end to the liquid dispensing end.

19. The beverage dispensing system of claim 18 wherein the decrease in the cross-sectional area of the internal passageway of the nozzle is continuous.

20. The beverage dispensing system of claim 19 wherein the cross sectional area profile of the internal passageway approximates the cross sectional area profile of a free flowing stream of liquid at ambient pressure.

21. The nozzle of claim 18 comprising a liquid dispersion member having a liquid receiving end and a liquid dispensing end.

22. The beverage dispensing system of claim 21 wherein the liquid dispersion member is removably supported within the liquid dispensing region of the internal passageway of the nozzle.

23. The beverage dispensing system of claim 22 wherein the liquid dispersion member is substantially immobile.

24. The beverage dispensing system of claim 21 wherein the liquid dispersion member further comprises a substantially obconical liquid dispersing surface.

25. The beverage dispensing system of claim 24 wherein the liquid dispersing surface of the liquid dispersion member extends from the liquid dispensing opening of the nozzle.

26. The beverage dispensing system of claim 25 wherein the liquid dispersing surface of the liquid dispersion member extends from the liquid dispensing end of the nozzle from about 0.2 inches to about 1.5 inches.

27. The beverage dispensing a system of claim 23 wherein the liquid dispersion member is adjustable.

28. The liquid dispersion member of claim 23 wherein the liquid dispersing surface has a gradually decreasing slope.

29. The liquid dispersion member of claim 28 wherein the liquid dispersing surface disperses liquid from the nozzle at an angle to the longitudinal axis of the nozzle.

30. The liquid dispersion member of claim 29 wherein the liquid dispersing surface disperses liquid from the nozzle substantially perpendicular to the axis of the nozzle.

31. The liquid dispersion member of claim 29 wherein the dispersing surface disperses liquid radially from the liquid dispersion member.

32. The beverage dispensing system of claim 18 wherein the nozzle further comprises at least two vertical channels.

33. The beverage dispensing system of claim 32 wherein the valve comprises a valve head, a valve stem and a valve body.

34. The valve of claim 33 wherein the valve body further comprises a valve shoulder that is on a bias to the valve stem.

35. The valve of claim 34 wherein the surface of the valve shoulder conforms to the inner contour of the valve housing.

36. The valve of claim 35 wherein a portion of the surface of the valve shoulder forms an acute angle to the axis of the valve stem.

37. The valve of claim 36 wherein the surface of the valve shoulder is concave.

38. A beverage dispensing apparatus comprising:
a nozzle;
a valve assembly upstream of the nozzle;
liquid dispersion member downstream of the valve assembly; and
a diffuser upstream of the valve assembly, the diffuser having a first end, a second end, and an internal passageway between the first end and the second end;
wherein the cross sectional area of the internal passageway of the diffuser increases from the first end to the second end.

39. The beverage dispensing apparatus of claim 38 wherein an angle of divergence from the axis of the diffuser to the surface of the internal passageway is less than 25 degrees.

40. The beverage dispensing apparatus of claim 39 wherein the divergence angle is 12 degrees or less.

41. The beverage dispensing apparatus of claim 40 wherein the divergence angle is 8 degrees or less.

42. A beverage dispensing apparatus comprising:
means for introducing the beverage to be dispensed into the beverage dispensing apparatus;
means for increasing the flow rate of liquid through the apparatus;
means for decreasing turbulence in the flow of the liquid;
means for reducing foaming of liquid dispensed from the apparatus;
and means for the controlled dispensing of liquid from the apparatus;
wherein the means for decreasing turbulence comprises a nozzle having an internal passageway, a liquid receiving end, and a liquid dispensing end, where the cross-sectional area of the internal passageway of the nozzle decreases from the liquid receiving end to the liquid dispensing end such that the cross-sectional area profile of the internal passageway approximates the cross sectional area profile of a free falling stream of liquid at ambient pressure.

43. The beverage dispensing apparatus of claim 42 further comprising means for reducing pressure.

44. The beverage dispensing apparatus of claim 43 further comprising means for cooling liquid in the beverage dispensing apparatus.

45. The beverage dispensing apparatus of claim 44 further comprising means for selectively controlling the fluid flow rate through the beverage dispensing apparatus.

46. A beverage dispensing apparatus comprising:
a container holding a carbonated beverage;
an energy source that pressurizes the carbonated beverage in the container;
a valve in fluid communication with the beverage in the container, the valve having an open position and a closed position, the valve having a valve housing, a valve seat and a valve head, the valve housing having an inlet and an outlet and a curved interior surface defining a curved fluid chamber, and a valve shoulder having a liquid facing surface, wherein the liquid facing surface is contoured to match the curvature of the interior surface for the valve housing.

47. The beverage dispensing apparatus of claim 46 wherein the liquid facing surface is generally the shape of a portion of an arced cylinder.

48. The beverage dispensing apparatus of claim 47 wherein the liquid facing surface is generally concave and has two radii of curvature.

49. The beverage dispensing apparatus of claim 46 wherein the valve head is generally elliptical.

50. The beverage dispensing apparatus of claim 46 wherein the valve head is generally spherical.

51. The beverage dispensing apparatus of claim 46 wherein the valve head opens in the direction of the valve housing inlet.

52. The beverage dispensing apparatus of claim 46 comprising means for selectively reducing the pressure of the liquid upstream from the nozzle.

53. The beverage dispensing apparatus of claim 52 wherein the means for selectively reducing the pressure of the liquid upstream from the nozzle comprises a multi-way valve.

54. The beverage dispensing apparatus of claim 53 wherein the means for selectively reducing the pressure of the liquid upstream from the nozzle comprises a length of beverage tubing.

55. The beverage dispensing apparatus of claim 52 wherein the means for selectively reducing the pressure of the liquid upstream from the nozzle comprises a multi-way valve and a length of beverage tubing, wherein the multi-way valve is capable of selectively routing fluid flow through or around the length of tubing.

56. A beverage dispensing apparatus for dispensing a beverage at least initially to atmospheric conditions from a beverage dispensing system, comprising a nozzle through which the beverage having an internal passageway, a liquid receiving end adapted to attach as the end element of the beverage dispensing system, and a liquid dispensing end that dispenses the beverage, wherein the cross-sectional area of the internal passageway of the nozzle decreases from the liquid receiving end to the liquid dispensing end such that it approximates the cross sectional area profile of a free falling stream of liquid at ambient pressure.

57. The beverage dispensing apparatus of claim 56 wherein the decrease in cross-sectional area of the internal passageway is continuous.

58. The beverage dispensing apparatus of claim 57 wherein the length of the nozzle is at least about three inches.

59. The beverage dispensing apparatus of claim 58 wherein liquid flowing through the nozzle is in substantially constant contact with the surface of the internal passageway.

60. The beverage dispensing apparatus of claim 56 comprising a liquid dispersion member having a liquid receiving end and a liquid dispersing end, the liquid dispersing end extending from the liquid dispensing end of the nozzle and radially dispersing the beverage exiting the liquid dispensing end of the nozzle.

61. The beverage dispensing apparatus of claim 60 wherein the liquid dispersion member is removably supported within the liquid dispensing end of the internal passageway of the nozzle.

62. The beverage dispensing apparatus of claim 60 wherein the liquid dispersion member further comprises a stem of substantially uniform circumference and a substantially obconical liquid dispersing surface.

63. The beverage dispensing apparatus of claim 62 wherein the liquid dispersing surface of the liquid dispersion member extends from the liquid dispensing end of the nozzle from about 0.2 inches to about 1.5 inches.

64. The beverage dispensing apparatus of claim 63 wherein the liquid dispersing surface of the liquid dispersion member extends from the liquid dispensing end of the nozzle from about 0.35 inches to about 0.6 inches.

65. The beverage dispensing apparatus of claim 64 wherein the liquid dispersing surface of the liquid dispersion member extends from the liquid dispensing end of the nozzle from about 0.4 inches to about 0.5 inches.

66. The beverage dispensing apparatus of claim 61 wherein the distance that the liquid dispersing surface of the liquid dispersion member extends from the liquid dispensing end of the nozzle is adjustable.

67. The liquid dispersion member of claim 63 wherein the liquid dispersing surface has a gradually decreasing slope.

68. The liquid dispersion member of claim 67 wherein the liquid dispersing surface disperses liquid from the nozzle at an angle to the longitudinal axis of the nozzle.

69. The liquid dispersion member of claim 68 wherein the dispersing surface disperses liquid from the nozzle substantially perpendicular to the axis of the liquid dispersion member.

70. The beverage dispensing apparatus of claim 56 wherein the cross-sectional area profile of the internal passageway gradually decreases from top to bottom according to the following formula:

$$A_h = \frac{Q}{\sqrt{\frac{16Q^2}{\pi^2 D_0^4} + 2gh}}$$

71. The beverage dispensing apparatus of claim 56 wherein the internal passageway of the nozzle comprises at least two vertical channels.

72. The beverage dispensing apparatus of claim 71 wherein the internal passageway of the nozzle comprises four vertical channels.

73. A beverage dispensing apparatus for dispensing a beverage at least initially to atmospheric conditions from a beverage dispensing system, comprising a nozzle having an internal passageway, a liquid receiving end adapted to attach as the end element of the beverage dispensing system, and a liquid dispensing end that dispenses the beverage, wherein the cross-sectional area of the internal passageway of the nozzle decreases from the liquid receiving end to the liquid dispensing end and where the nozzle is configured such that the beverage flowing through the nozzle substantially fills the entire cross-sectional area of the nozzle and is in substantially constant contact with the surface of the internal passageway from the liquid receiving end to the liquid dispensing end.

* * * * *